Figure 1:
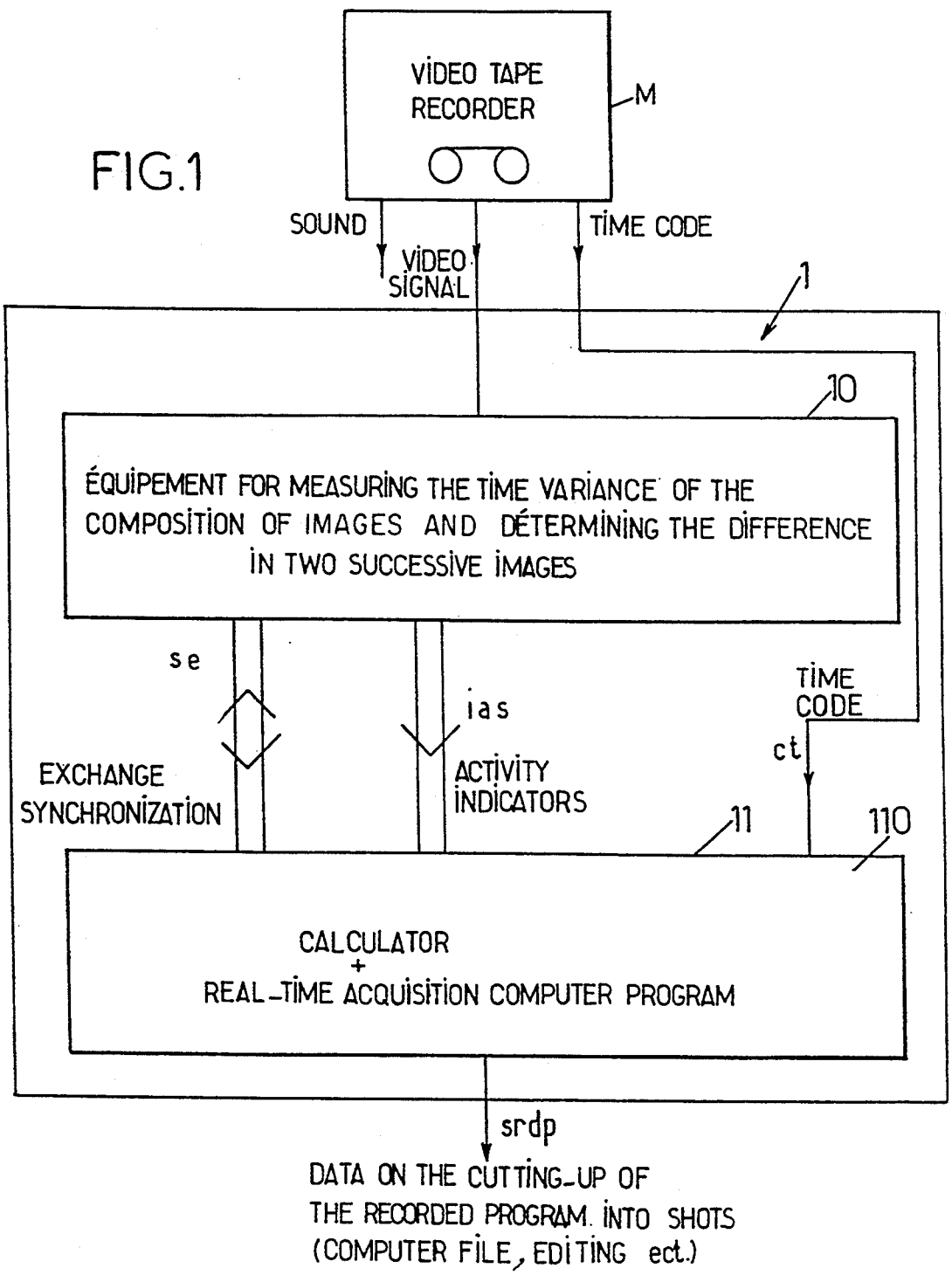

United States Patent [19]

LeBrat et al.

[11] Patent Number: 5,339,166
[45] Date of Patent: Aug. 16, 1994

[54] MOTION-DEPENDENT IMAGE CLASSIFICATION FOR EDITING PURPOSES

[75] Inventors: François LeBrat, Paris; Jean-Marie Fouillet, Neuilly Sur Marne; Francis Etienne, Clamart, all of France

[73] Assignee: Telediffusion De France, France

[21] Appl. No.: 968,063

[22] Filed: Oct. 30, 1992

[30] Foreign Application Priority Data

Oct. 30, 1991 [FR] France ................... 91 13397

[51] Int. Cl.$^5$ ............................... H04N 5/93
[52] U.S. Cl. ..................... 358/311; 360/14.1
[58] Field of Search .................. 358/311, 335; 360/14.1–14.3; H04N 5/92, 5/93

[56] References Cited

U.S. PATENT DOCUMENTS 4,746,994  5/1988  Ettlinger .
5,040,081  8/1991  McCutchen .
5,191,436  3/1993  Yonemitsu ................ 358/311 X

FOREIGN PATENT DOCUMENTS 0378393  7/1990  European Pat. Off. .
2630572 10/1989  France .
2226718  7/1990  United Kingdom .

*Primary Examiner*—Mark R. Powell
*Attorney, Agent, or Firm*—Larson and Taylor

[57] ABSTRACT

A video analysis system for editing an edited or broadcast televised program, which is a succession of images of order k, that can be used for post-production techniques such as multilingual post-production techniques. The system comprises a circuit for measuring the time variance of the composition of the images, establishing, time-wise, the composition of the images so as to establish an image difference signal and scenic-activity parameters of the broadcast program for a group of at least two successive images of order $k-1$, k. An analysis circuit makes it possible to establish from the scenic-activity parameters, data representative of the cutting-up into shots, consisting of a group of p successive images, of the broadcast, televised program.

17 Claims, 15 Drawing Sheets

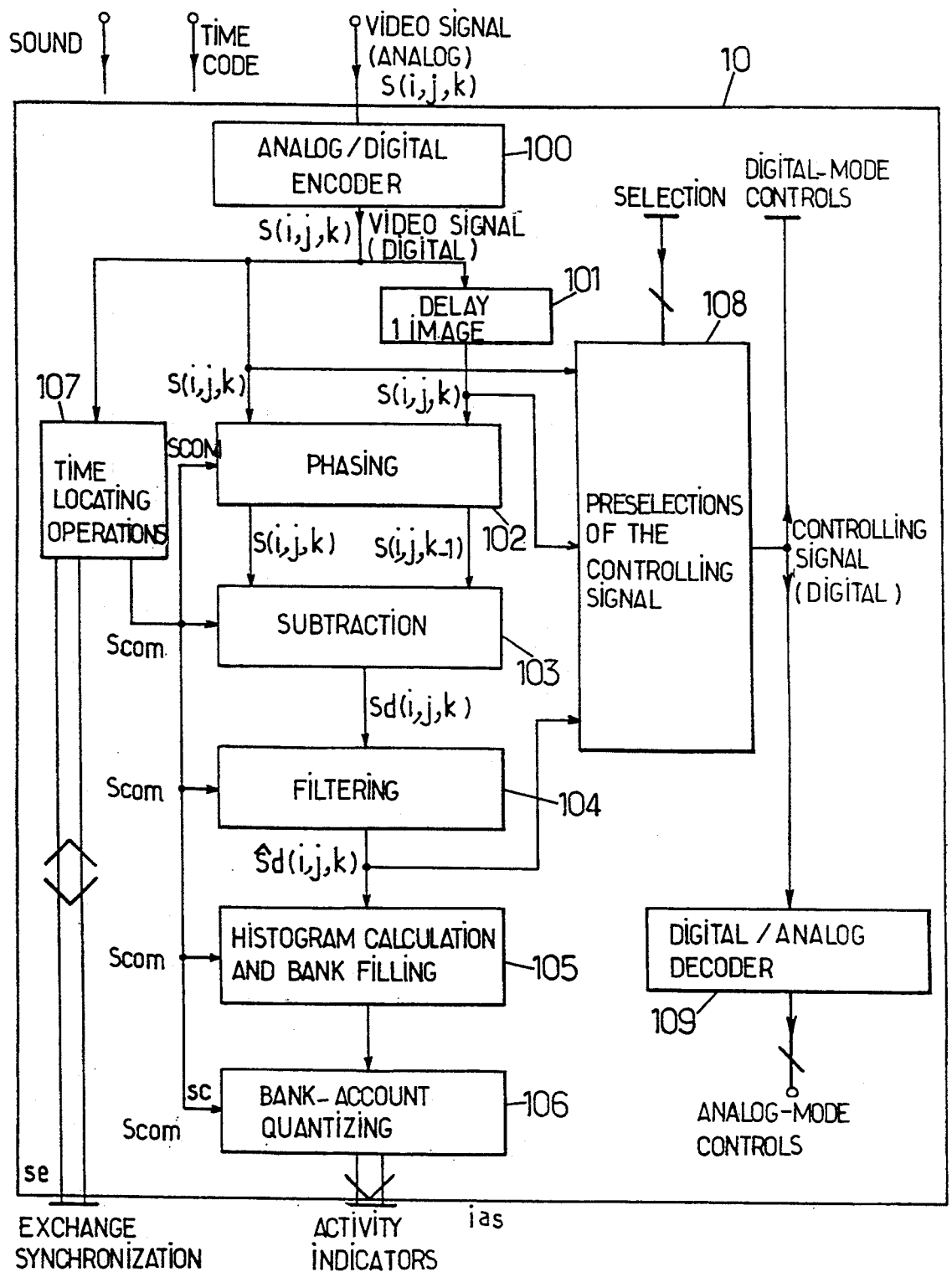

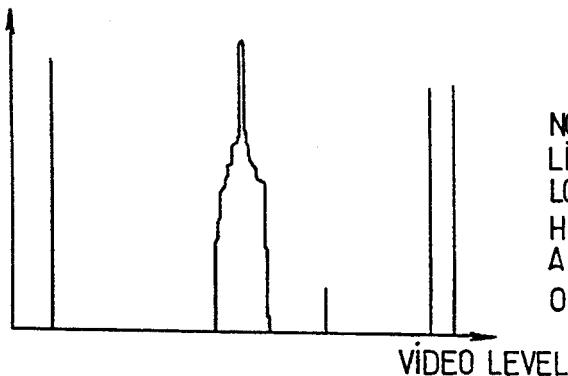

FIG. 2b-1

NO CHANGE OF SHOT
LITTLE MOVEMENT
LOW ACTIVITY
HISTOGRAM CENTRED ON
A RESTRICTED NUMBER
OF VIDEO LEVELS

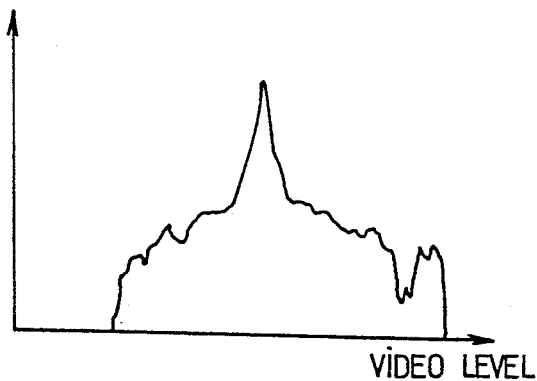

FIG. 2b-2

CHANGE OF SHOT OR
SIGNIFICANT MOVEMENT
HIGH ACTIVITY,
WIDE SPREAD OF THE
HISTOGRAM OVER THE SET
OF VIDEO LEVELS

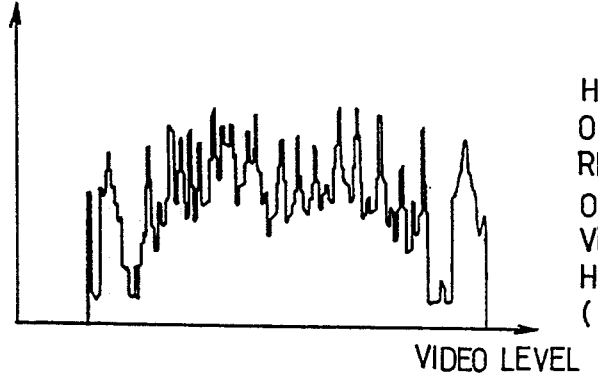

FIG. 2b-3

HISTOGRAM OF THE LEVELS
OF THE DIGITAL SIGNAL
REPRESENTING THE LUMINANCE
OF A VIDEO IMAGE
VERTICAL AXIS: LOG SCALE ($10^0$ TO $10^5$)
HORIZONTAL AXIS: VIDEO LEVEL
(0 TO 255)

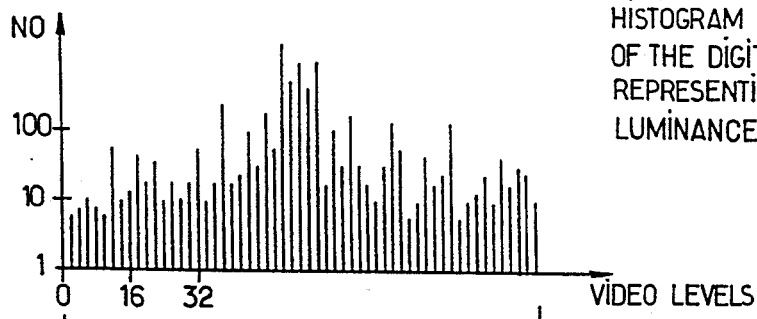

HISTOGRAM OF THE LEVELS
OF THE DIGITAL SIGNAL
REPRESENTING THE INTER-IMAGE
LUMINANCE DIFFERENCES

FIG. 3b-1

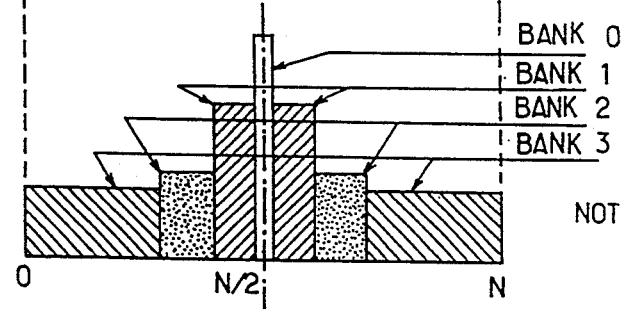

DISTRIBUTION OF THE LEVELS
IN THE BANK (IN THE EXAMPLE,
4 BANKS CENTRED ON THE
DIFFERENCES)
NOTE; THE WIDTH OF END BANK
DEPENDS ON THE NUMBER OF
BANKS AND ON A PARAMETER
ASSIGNMENT LINKED TO THE
NATURE OF THE IMAGES

FIG. 3b-2

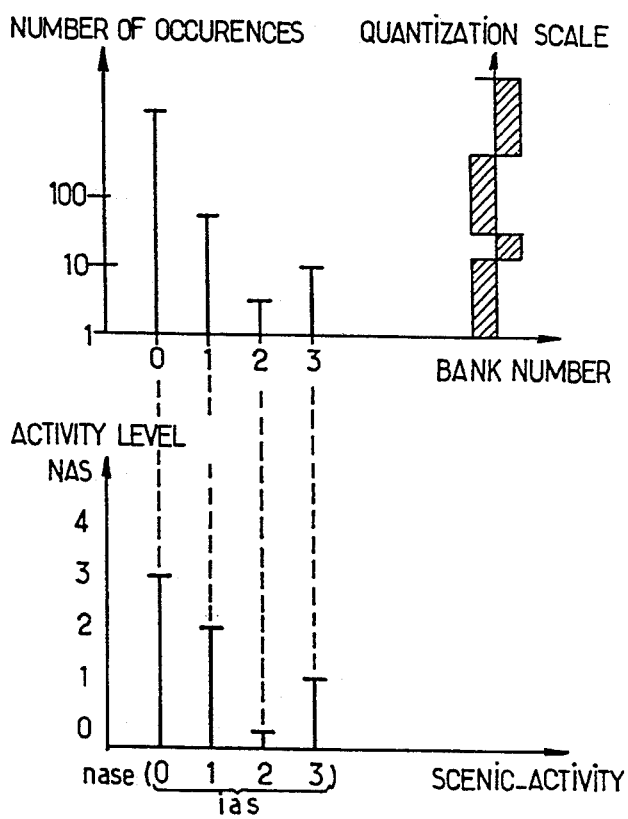

HISTOGRAM OF THE BANK
ACCOUNTS AND QUANTIZATION
SCALE.
THIS SCALE MAY BE NON LINEAR
AND PARAMETERIZED
(DEPENDING ON THE NATURE OF
THE IMAGES AND THEIR
ANALYSIS)

FIG. 3b-3

ACTIVITY INDICATORS COMING
FROM THE QUANTIZINZ OF THE
BANK ACCOUNTS

FIG. 3b-4

1 EXAMPLE OF ACTIVITY-LEVEL DECISION

NO ACTIVITY  NASE(0)>2
NASE(1)=0
NASE(2)=0
NASE(3)=0

LOW ACTIVITY  NASE(0)>2
NASE(1)≥1
NASE(2)=0
NASE(3)=0

MEDIUM ACTIVITY  NASE(0)>2
NASE(1)≤1
NASE(2)≥1
NASE(3)=0

HIGH ACTIVITY  NASE(0)≤2
OR
NASE(3)≥2

Figure 3A:
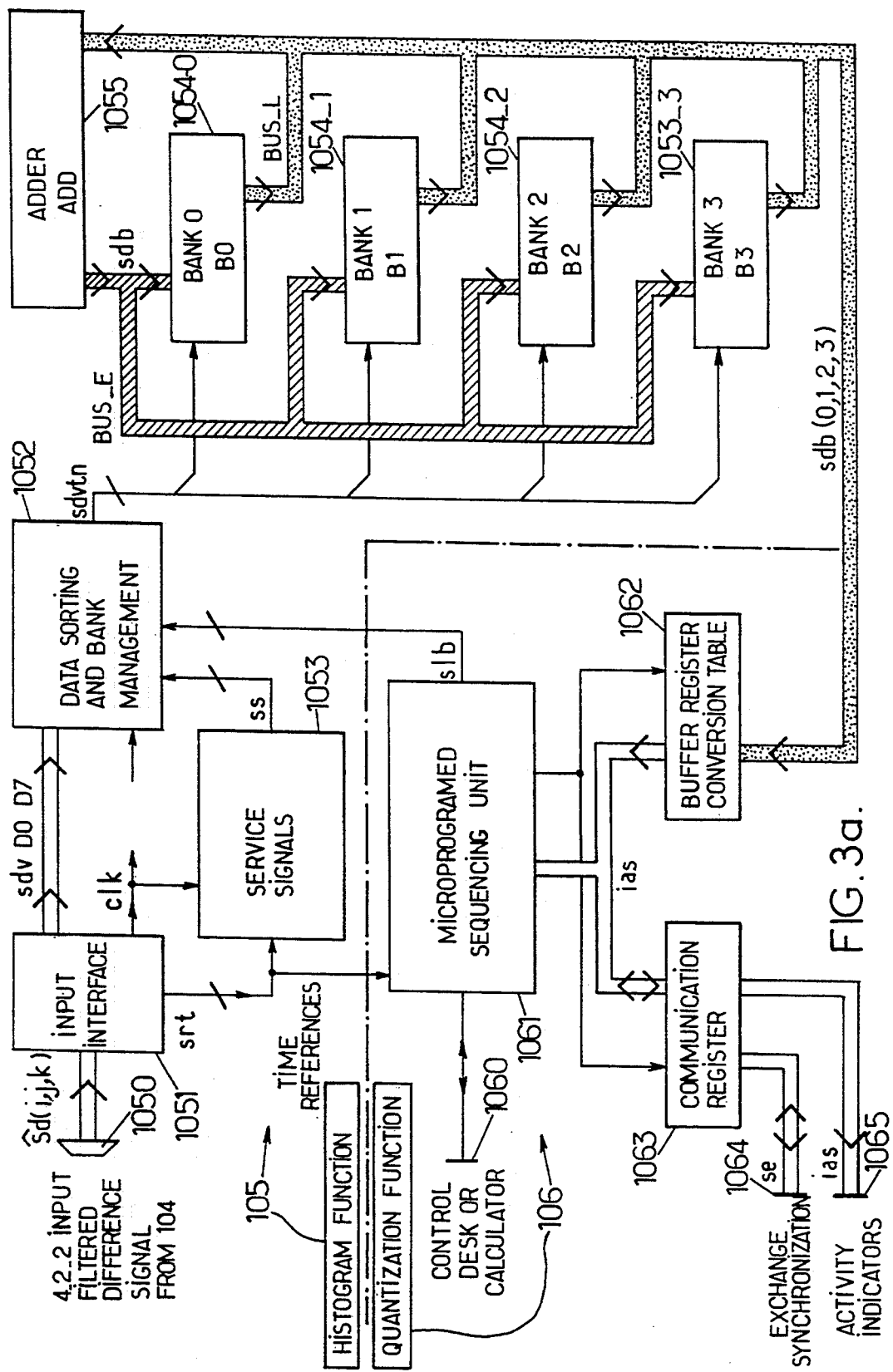
Figures 1, 3C:
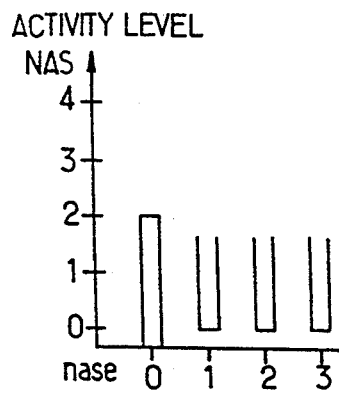
Figures 2, 3C:
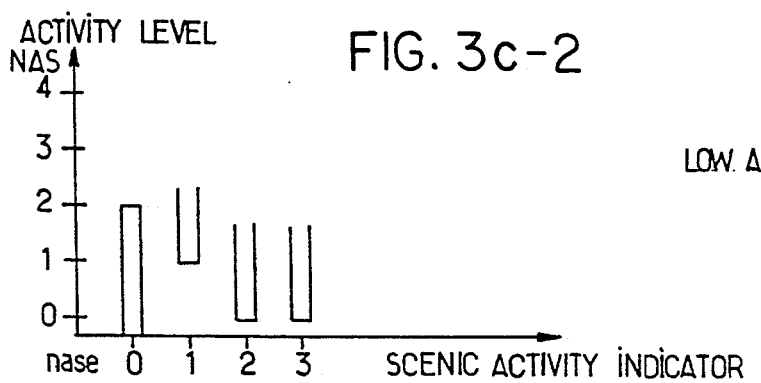
Figures 3, 3C:
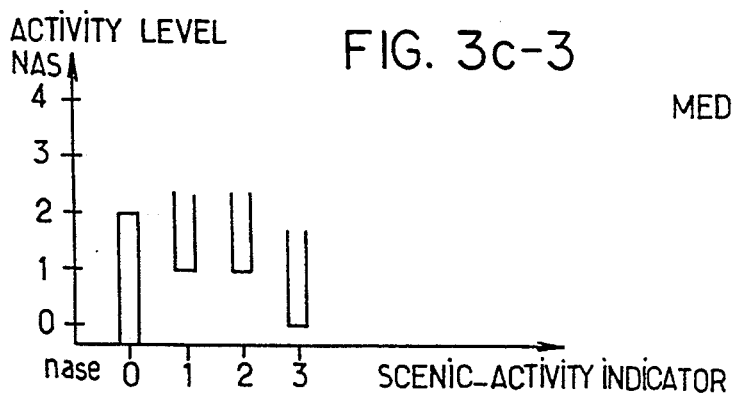

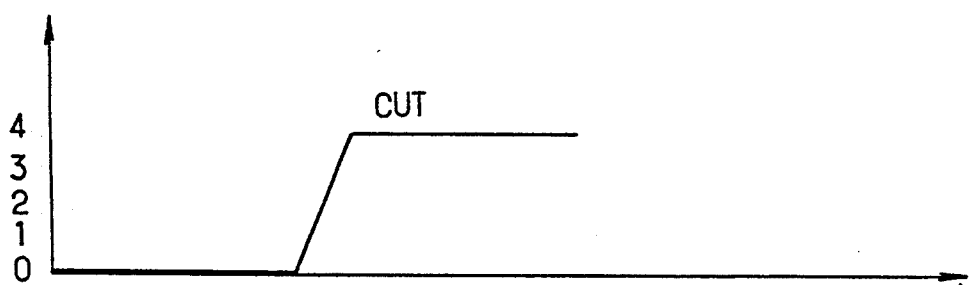
FIG. 4a-1
FIG. 4a-2
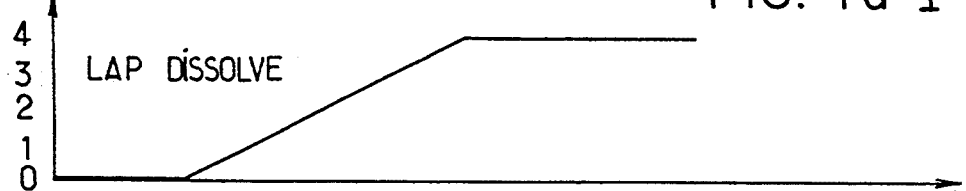
FIG. 4a-3
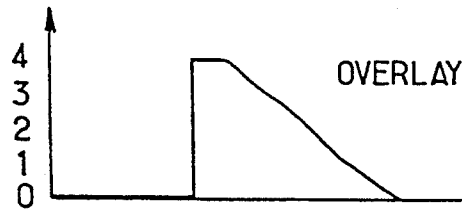
| SHOT ORDER P | TIME CODE ct tl : m : s : cs | DURATION OF THE SHOT IN NUMBER OF IMAGES $_{P=}$ |
|---|---|---|
| 1 | 0 : 02 : 00 : 00 | 200 |
| 2 | 0 : 02 : 08 : 00 | 100 |
| 3 | 0 : 02 : 12 : 00 | 1 |
| 4 | 0 : 02 : 12 : 01 | 1 |
| 5 | 0 : 02 : 12 : 02 | 5 |
| 6 | 0 : 02 : 12 : 07 | 500 |
| 7 | 0 : 02 : 37 : 07 | |
FIG. 4b.  srdp  SIGNAL REPRESENTATIVE OF THE CUTTING-UP INTO SHOTS

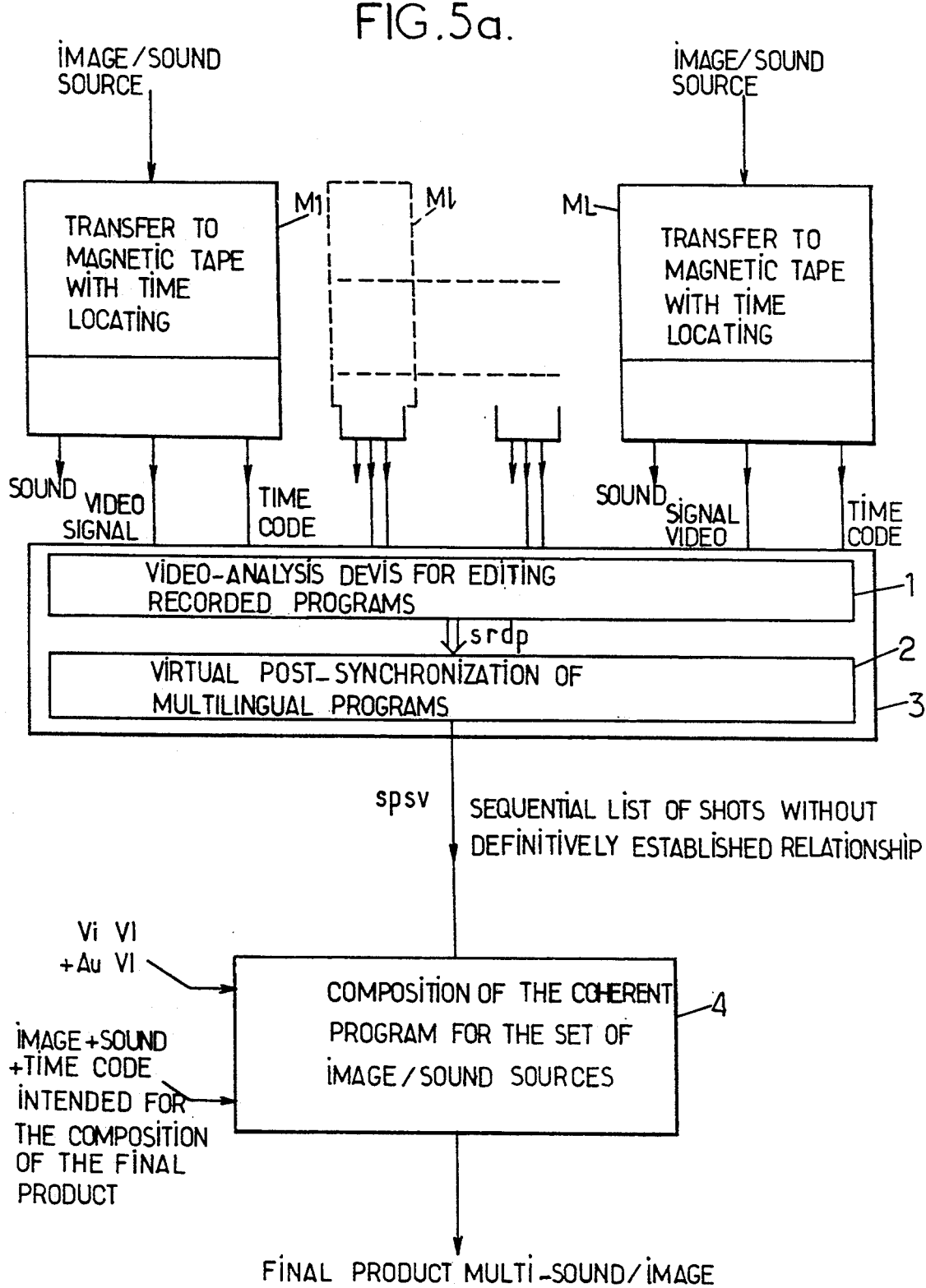

COMPARISON ALGORITHM WITH A VERY-CLOSE EQUALITY CRITERION FOR 3 CONSECUTIVE SHOTS

FIG.6a.

|  | VERSION 1 |  | VERSION 2 |
|---|---|---|---|
| SHOT P_1 { | DUR P_1 | = | DUR M-1 |
|  | TRANS P_1 | = | TRANS M-1 |
|  | DUR P | = | DUR M |
|  | TRANS P | = | TRANS M |
|  | DUR P+1 | = | DUR M+1 |
|  | TRANS P+1 | = | TRANS M+1 |

COMPARISON ALGORITM WITH STRICT EQUALITY CRITERION FOR 3 CONSECUTIVE SHOTS

| VERSION 1 |  | VERSION 2 |
|---|---|---|
| TRANS P_2 |  | TRANS M-2 |
| DUR P_1 |  | DUR M-1 |
| TRANS P_1 |  | TRANS M-1 |
| DUR P | = | DUR M |
| TRANS P | = | TRANS M |
| DUR P+1 |  | DUR M+1 |
| TRANS P+1 |  | TRANS M+1 |

COMPARISON ALGORITHM FOR 3 CONSECUTIVE SHOTS WITH:
- STRICT EQUALITY CRITERION FOR THE SHOT P
- CLOSE OR VERY-CLOSE EQUALITY CRITERION FOR THE 2 ADJACENT SHOTS

FIG.6b.

DIRECT COPY OF TWO ASSOCIATED SHOTS

COPY OF TWO ASSOCIATED SHOTS WITH END CUTTING (2 IMAGES)

MOTION-DEPENDENT IMAGE CLASSIFICATION FOR EDITING PURPOSES

Improved quality television systems, and future high-definition television systems, provide, with respect to conventional SECAM or PAL television systems, not only an improvement in the quality of the video and audio-frequency signals broadcast but also a variety of extensions to the existing functions, or even the introduction of new services.

By way of example, it will be recalled that the D2-MAC/Packets broadcasting system, beyond the improvement in the quality of the images and of the sound, especially provides an extension of the capacity of the channels reserved for the transmission of program-accompanying data, access control, subtitles, the possibility of simultaneously broadcasting several sound-track programs, for the broadcasting of multilingual programs, and the introduction of an 16/9 ratio enlarged image format, this format being required as the basis of televised programs broadcast in high definition in the future.

Although the D2-MAC/Packets broadcasting system is currently operational, the adaptation of this system to high-definition television having to be operational in the next three to four years, the potential of this broadcasting system is however under-exploited, as the implementation of the aforementioned additional services involves carrying out, in a studio, complementary operations for producing or for preparing programs, the technical feasibility of which, and the corresponding costs, have not been completely brought under control.

In the expectation of an evolution in video production techniques and the appearance of a significant associated production volume, cinematographic films constitute an important, if not the only, program resource capable of immediately exploiting the potential of the standards of these new television systems. Moreover, as regards the qualitative aspect, both visual and sound-track, cinema films, in the most part, make it possible to reach, after transfer to a video medium, the optimum quality which the high-definition television broadcasting systems can provide. Furthermore, one major advantage of cinema films produced for viewing in a cinema hall is their image format, which lends itself easily to the preparation of television programs with the 16/9 enlarged format. However, if the cinema film is intended to be broadcast in 16/9 format by means of a television system ensuring a reception compatible with a conventional 4/3 image format using a panorama technique, that is to say by reduction of the corresponding lateral zones, a post-production operation has to be performed in a studio, before broadcasting, so as to establish the position of the reframing compatible with the 4/3 format for each image of the program.

Other functions may be implemented by using and supplementing operations which have already been accomplished for the use of cinema films in a cinema hall.

Within the scope of the compiling of multilingual programs, a saving in costs of making such programs can be obtained with cinema films by collecting, for the same film, the sound-track versions which have already been translated or dubbed in order to be used in various countries. The supplementary operation then consists in synchronizing the various adopted sound-track versions with a common video version as a reference image.

Within the scope of the compiling of subtitles, from the use of subtitled cinema film archives, a similar principle may be applied, according to standards established for television.

The operating procedures and the installations used by companies specializing in the various cinema or videofilm post-production operations have formed the subject of numerous publications.

In general, as regards the automation of the post-production tools, it is possible to imagine the introduction of editing stations which enable a human operator to remotely control, from a central workstation, all the equipment involved in making the final product, such as video tape recorders, audio tape recorders, video/audio mixers, etc., to simulate the result of an editing operation before executing, listening to and viewing it by the operator, to store a list of editing decisions and to make, by selective assembly, a final product by automatically executing the stored editing instructions.

However, it will be noted that the automation of the aforementioned editing process is limited to remote-control operations of equipment and to finally making the product when the editing decisions, established by the human operator, have been stored.

Of course, in general the post-production operation consists therefore in assembling prerecorded images and sound, from original film shootings ("rushes"), or in embellishing an existing program with supplementary information such as additional sound, subtitles, or assistance data, in order to compile a final program intended for television broadcasting.

An important and essential part of the work of the human operator performing the editing, consists in locating on the source media or original recordings, the image sequences, constituted by one or more images which will be used for producing the final product. In television, video tape recorders use, for this purpose, a time code which associates, with each recorded image, a unique instant in the form of hour, minute, second and image number. The aforementioned time code enables the play-back of the video tape recorders, for final recording or viewing, to be controlled. The sequences to be edited are thus identified by a start and end time-code.

In the particular case of a multilingual post-synchronization operation, a first analysis step is performed by the human operator so as to identify divergences between the editing guides or leaders—concatenation lists for the sequences of images—of the various dubbed versions and then to define, case by case, the solutions to be implemented in order to treat the incidents picked up. The final step is the production of the final medium, in accordance with the video-editing and sound-treatment instructions which will have been adopted by the human operator.

A first drawback of this operating procedure is, of course, the time spent by the human operator in order to discriminate and to pick up the information locating the image sequences, or shots, by viewing the original recordings. It will be recalled that a shot is a succession of images presenting, for an observer or a spectator, an analogy of scenic activity. Moreover, it will be noted that for many post-production applications, the locating of the shots, or image sequences, is limited to picking up the start and end time-codes of the shot, which are characteristic of the latter, these values being stored for assembling the medium for the final program.

Another drawback of the aforementioned operating procedure relates to the accuracy of the locating, which accuracy may be affected not only by a reading error by the human operator, but also by the fact that, when a video tape recorder is reading at low speed or in discrete mode, image by image, which is necessary for viewing by the human operator, the precision of the time code associated with the current image is not always guaranteed. Such a drawback is liable to be particularly irksome when editing requires single-image accuracy, specially in the case of the 4/3, 16/9 panorama technique or reframing, for audio post-synchronization for example.

In the particular case of compiling a multilingual program, by post-synchronization of preexisting dubbed versions, which are considered as original recordings, the current operating procedure relies on a first comparison of two monolingual versions in order to make a provisional bilingual version, and then in comparing the aforementioned bilingual version with another monolingual version in order to produce a trilingual version, and so on and so forth. A drawback of such an operating procedure is a loss of the recording quality of the final multilingual product or program, on account of deterioration in the recordings of the audio- or video-frequency data, which deterioration is generated on successive copies by the recording equipment.

The object of the present invention is to overcome the aforementioned drawbacks by the implementation of a video analysis system for editing a recorded or broadcast, televised program enabling the post-production operations to be performed semi-automatically, intervention by a human operator being virtually eliminated or reserved to a few special cases.

A subject of the present invention is the implementation of a real-time video analysis system for editing a recorded or broadcast, televised program, enabling, during the reception of a broadcast program or the play-back of a recorded program, an indicator of the time variations of the composition of the image signal to be picked up and the various image sequences or shots of the program in question to be identified, which enables the various shots, such as a "cut" shot, lap dissolves or other shots of the program in question to be discriminated qualitatively.

A further subject of the present invention is the implementation of a real-time video analysis system for editing a recorded or broadcast, televised program making it possible to identify video editing discrepancies which can arise between various recording versions of the same program, so as to establish a leader enabling a final program version, optimized by post-production operations, to be produced.

A further subject of the present invention is finally the use of a real-time video analysis system for editing a recorded or broadcast, televised program for the production, from a plurality of different monolingual versions, of a multilingual program by post-synchronization operations.

The video analysis system for editing a recorded or broadcast, televised program in the form a succession of images, each image being recorded or broadcast in the form of audio- and video-frequency data associated with the image of order k in question and of an associated time code representative of said image, which is the subject of the present invention, is noteworthy in that it comprises circuits for measuring the time variance of the composition of the images, by determination, between two successive images of order $k-1, k$, of an image difference signal and of corresponding parameters representative of the scenic activity of the recorded or broadcast program for a group of at least two successive images, of order $k-1, k$. Circuits for analyzing the recorded or broadcast program make it possible, from the difference signal and from the corresponding parameters representative of the scenic activity, to establish data representative of the cutting-up into shots, which consist of a group of p successive images, of the recorded or broadcast program.

The use of a video analysis system for editing a recorded or broadcast, televised program in the form of a succession of images, in accordance with the preceding declaration, is noteworthy in that, with a view to producing a composition of multilingual-narrative televised programs by post-synchronization of monolingual-narrative programs, attributes of common video images of the same program, this use consists in performing an analysis step for each monolingual program in order to establish the shot representative data, consisting of a group of pl successive images, where pl denotes, for the monolingual version 1 in question, the number of constituent images of a shot Pl in question, then in establishing a systematic correlation between the various shots of each monolingual version, these consisting of a predetermined number pl of successive images for each monolingual version and each monolingual narrative, this correlation enabling the time and/or cardinal data, in terms of the number of successive images pl which are minimum and maximum constituents of a given shot Pl, enabling all the monolingual narratives in question to be carried. The data are then stored in vector form (Pml, Pl1, pl1, ..., Plt, plt, ..., Pln, pln), so as to constitute a frame for composing or editing the multilingual program in which, with the order of the shots Pml which can enter into the composition of the final multilingual program, there are associated, for each monolingual version 1, 1 representing the order of the monolingual version in question, the order of the shot Plt, the number of successive images plt and the time data for the start and finish of the shot Plt in question.

The video analysis system for editing a recorded or broadcast, televised program, which is the subject of the present invention, finds an application in all post-production techniques such as automation of the locating of changes in shots arising in a program for compiling and synchronizing various accompanying data for programs, reframing by panorama technique, subtitling, colorization of original black and white films, automating the process for the post-synchronization of films for compiling multilingual television programs from dubbed original recordings. It may also be used in operations for checking duration of transmission broadcasts on parallel antenna recordings, for conformity of the specification of programing companies, for conformity of the broadcasting times of advertising slots or of political broadcasts during electoral campaigns.

Figure 2C:
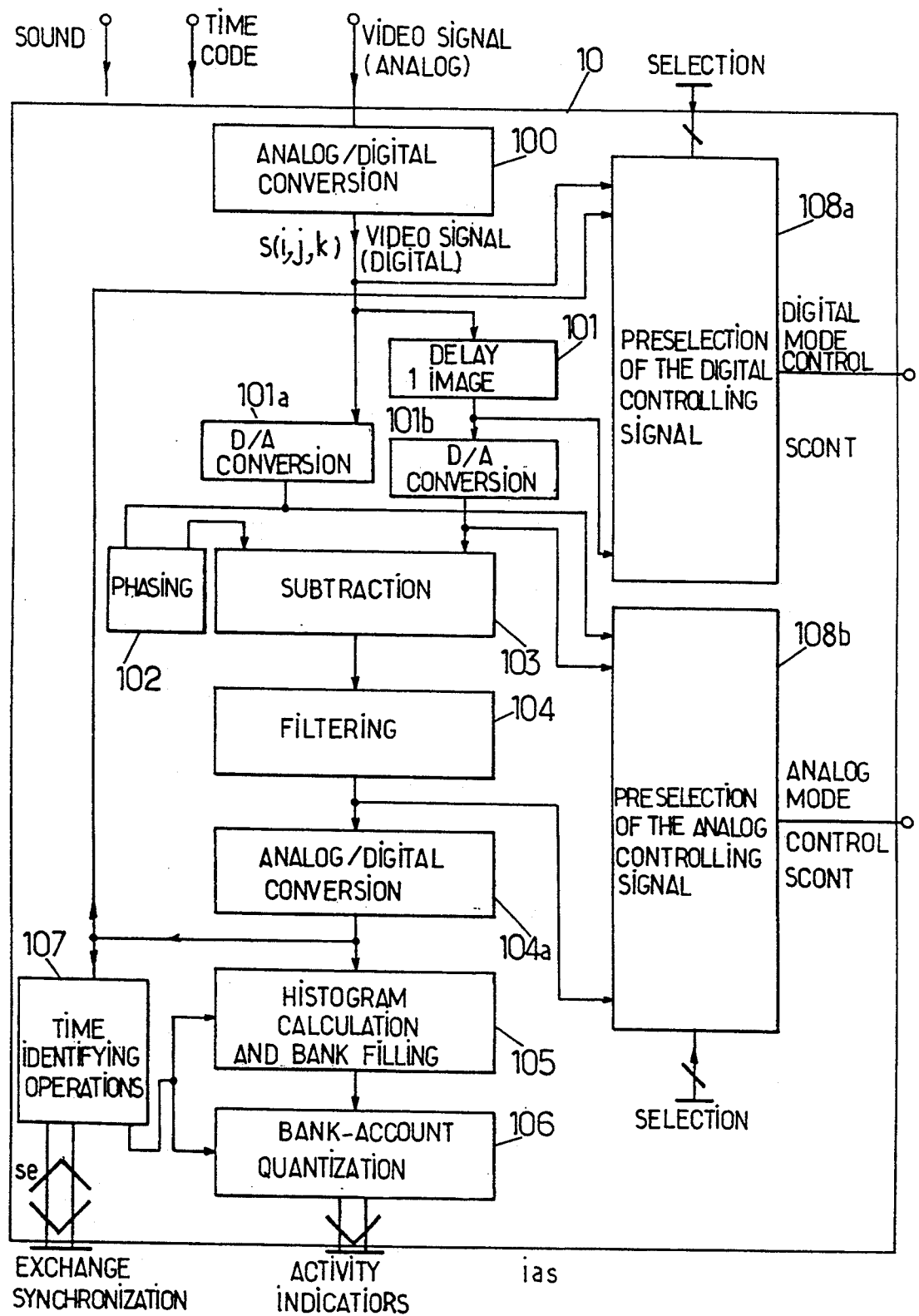

A more detailed description of the video analysis system for editing a recorded or broadcast, televised program, which is the subject of the present invention, will be given in the following description and in the drawings in which:

FIG. 1 represents a block diagram of a video analysis system, which is the subject of the present invention, FIG. 2a represents a block diagram of a first embodiment, entirely using digital technology, of an element of the system as represented in FIG. 1, FIGS. $2b_1$ to $2b_3$ represents various histograms characteristic of the number of occurrences, for one image, of the amplitude values of the video samples, FIG. 2c represents a block diagram of a second embodiment, using digital and analog technology, of the same element as in the case of FIG. 2a, FIG. 3a represents a block diagram for production of circuits for histogram calculation and for quantification of the bank accounts, FIGS. $3b_1$ to $3b_4$ represents, at its points 1 to 4, various diagrams relating to the establishment of the histogram implemented in FIG. 3a, FIGS. $3c_1$ to $3c_4$ represents various models for deciding the level of scenic activity, these levels being subdivided into absence of activity, low activity, medium activity and high activity situations;

FIGS. $4a_1$ to $4a_3$ represents various types of standard shots permitting, by comparison, the cutting into successive shots of a broadcast program, these standard shots being characterized by the mode of variation of their scenic activity during a time interval or a corresponding given number of successive images, FIG. 4b represents, in an analog fashion, the structure of the representative signal of the cutting-up into shots of a recorded or broadcast, televised program, such as supplied by the system represented in FIG. 1, which is the subject of the present invention.

Figure 5B:
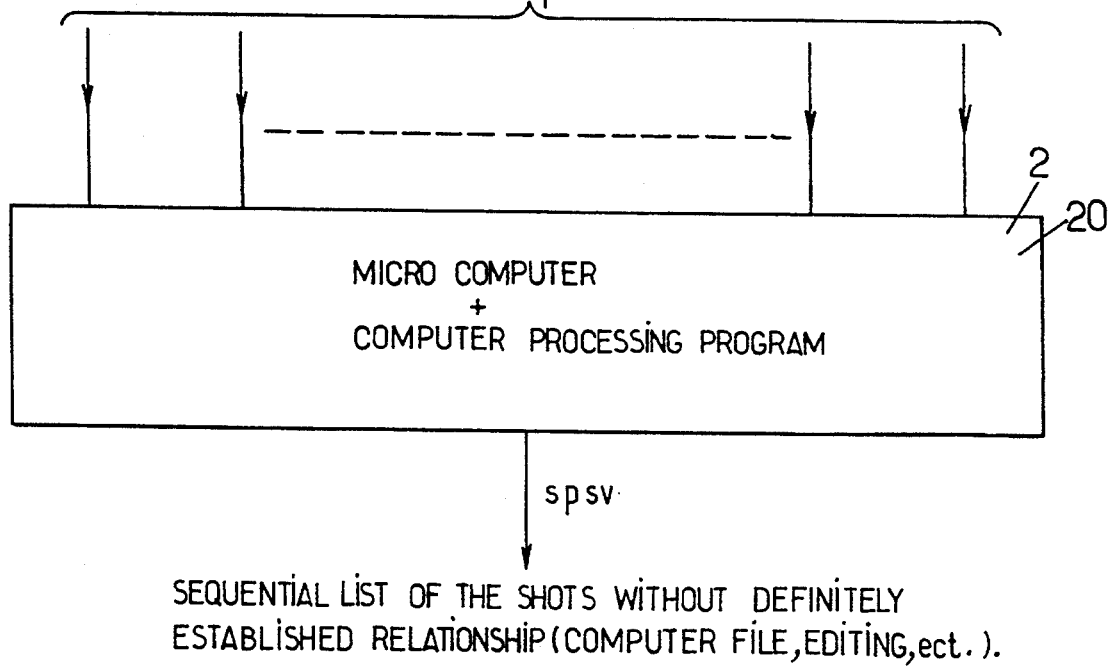
Figure 6C:
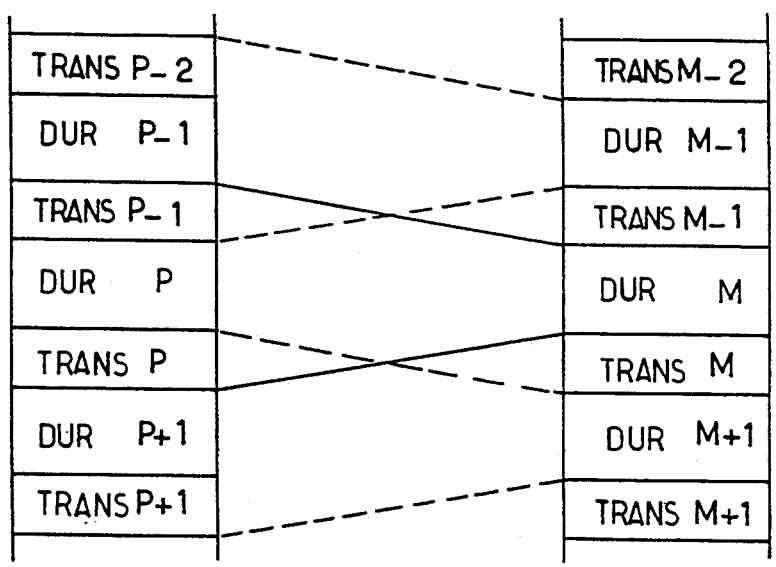
Figure 7:
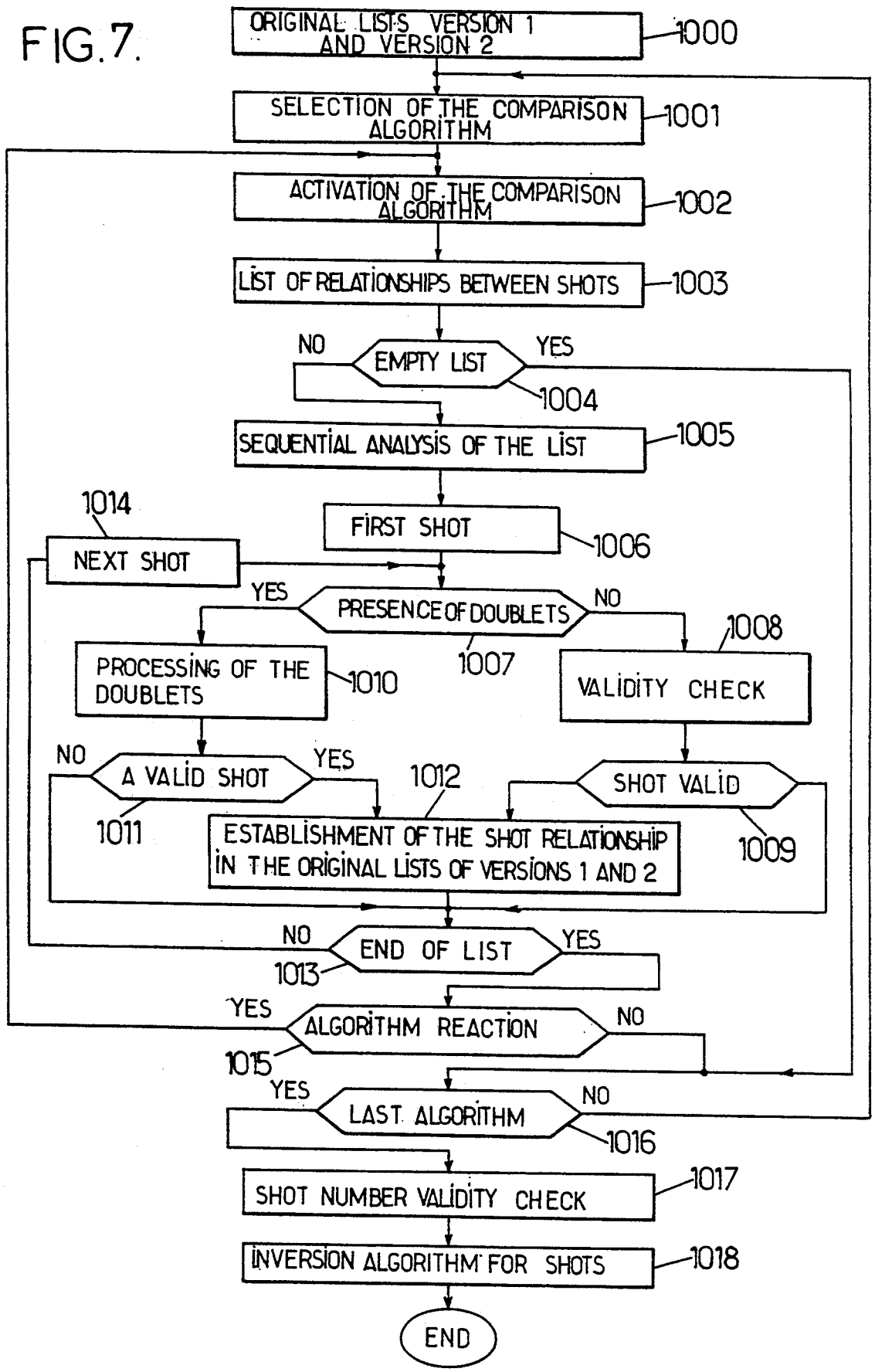
Figure 8A:
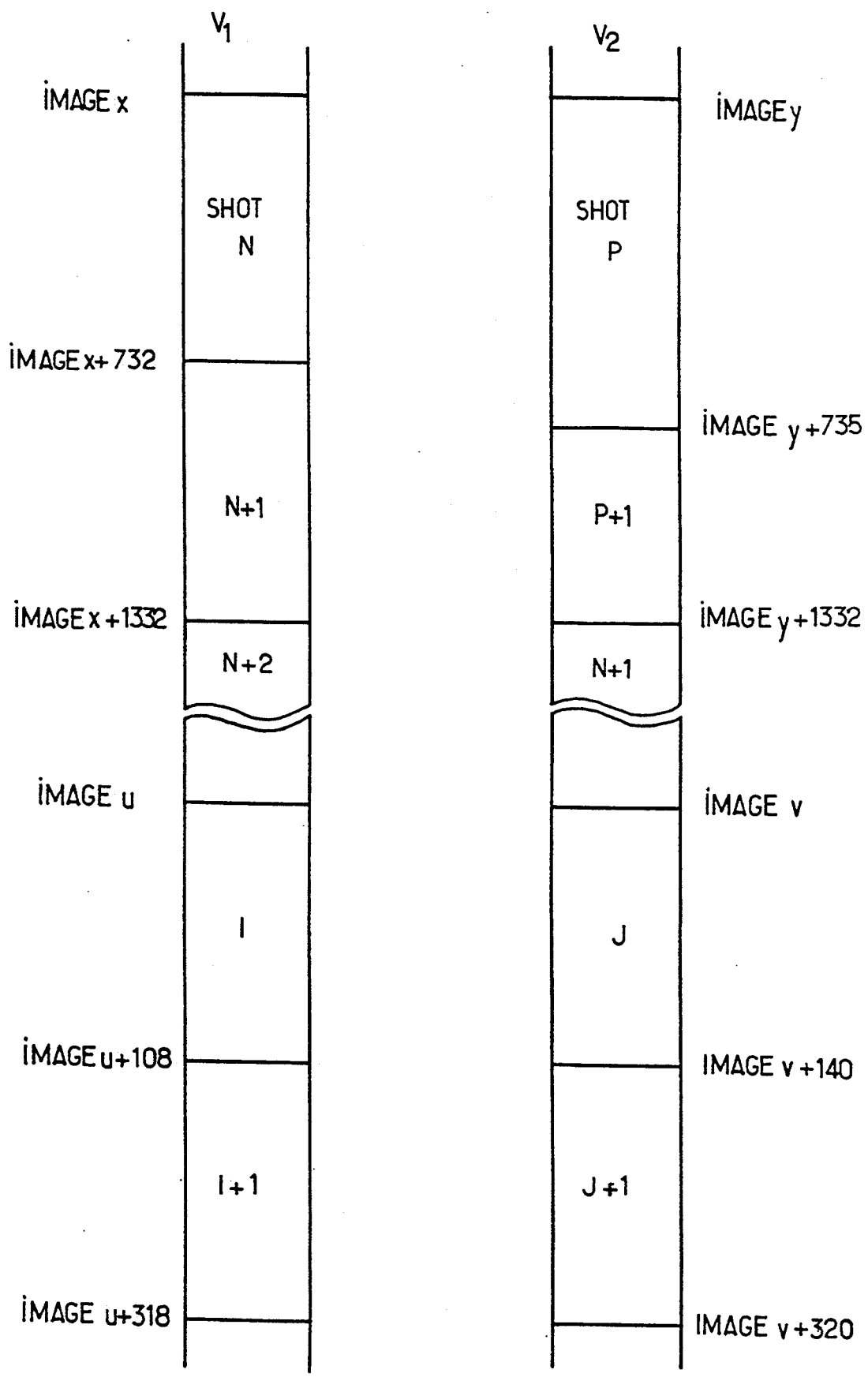

FIG. 5a represents a block diagram of an installation permitting the use of a video analysis system in an application for composing multilingual-narrative televised programs by post-synchronization of monolingual-narrative programs, attributes of common video images of the same program, FIG. 5b represents a block diagram relating to the system for obtaining the shots of scenic activity, without a definitively established relationship, FIG. 6a represents a comparison algorithm with a strict equality criterion for three consecutive shots of a first and a second monolingual version, FIG. 6b represents a comparison algorithm for three consecutive shots with a strict equality criterion for a shot of order N and close or very close equality criterion for the 2 surrounding shots, FIG. 6c represents a comparison algorithm with close or very close equality criterion for three consecutive shots, FIG. 7 represents a flow chart of a program for putting the shots of a first and a second monolingual version into relationship in order to produce a bilingual version, FIGS. 8a, $8b_1$ to $8b_3$ and $8c_1$ to $8c_2$ represent an advantageous variant for putting shots into coincidence or for synchronizing various monolingual linguistic versions.

A more detailed description of the video analysis system for editing a televised program, which is the subject of the present invention, will now be given in conjunction with FIG. 1 and the following figures.

In general, it may be considered that the aforementioned program is televised, recorded or broadcast, in the form of a succession of images, each image being recorded or broadcast in the form of audio- and video-frequency data associated with the image of order k in question and of a time code, denoted by ct, associated with and representative of this image. FIG. 1 represents, purely by way of non-limiting example, the aforementioned program supplied to the system 1, which is the subject of the present invention, for example by a video tape recorder, denoted by M. The essential signals supplied by the video tape recorder are thus the audio-frequency signal, the video-frequency signal and the aforementioned time code ct.

In general, it may be considered that the aforementioned signals are signals supplied in digital form, so as to simplify and condense the following description.

Thus, as represented in FIG. 1, the system 1, which is the subject of the present invention, comprises a circuit 10 for measuring the time variance of the composition of the images, this circuit, in accordance with a particularly noteworthy aspect of the subject of the present invention, permitting the measurement of the aforementioned variance by determination, between two successive images of order $k-1$, k, of an image difference signal and of corresponding parameters representing the scenic activity of the recorded or broadcast program for a group of at least 2 successive images of the aforementioned order $k-1$, k.

Furthermore, as has also been represented in FIG. 1, the system 1, which is the subject of the present invention, comprises a circuit 11 for analyzing the recorded or broadcast program, making it possible, from the aforementioned image difference signal and essentially from the corresponding parameters representative of the scenic activity between two successive images, to establish data representative of the cutting-up into shots, these shots consisting of a group of p successive images, of the recorded or broadcast, televised program. In FIG. 1, the data representative of the cutting-up into shots are denoted by srdp and indicate a corresponding signal representative of the cutting-up of the aforementioned program into shots.

Thus it will be understood that the system, which is the subject of the present invention, makes it possible, from a measurement of the scenic activity of two consecutive images, the scenic activity being connected with the relative movements from one image to the next image of the objects constituting this image and, definitively, from the shot for observation by the viewer, thus to discriminate a distribution of successive constituent shots of the aforementioned recorded or broadcast, televised program.

It will also be noted that, throughout the following description, the set of aforementioned digital signals consists either of digital signals transmitted by the data-link BUSES between the various constituent elements of the video analysis system for editing a recorded or broadcast, televised program, which is the subject of the present invention, or of corresponding computer files containing the digital data representative of the item of information conveyed by the aforementioned signals.

A more detailed description of the circuit 10 for measuring the time variance of the composition of the images will be given in conjunction with FIG. 2a.

The present description of the circuit 10 for measuring the time variance of the composition of the images, in accordance with the subject of the present invention, is given within the scope of the non-limiting example of a 4-2-2 type digital video signal, transmitted with 625 lines in real time, so as to measure from it the time variance of the composition of the images conveyed by this video signal.

For a more detailed description of the shape of the aforementioned video signal, reference may usefully be made to the corresponding standard established in 1982 by the CCIR (International Consultative Committee for Radio Communications) and, in particular, to Recommendations 601 and 656 of volume XI of the Notices and Reports of the CCIR.

In the aforementioned embodiment, the processing applied, in accordance with the subject of the present invention, is restricted to the digital data of the luminance signal of the active lines of the first frame of each image, i.e. 288 lines of 720 samples coded over 8 bits at the rate of 25 images per second.

The aforementioned video signal, which is an analog signal, is denoted in FIG. 2a by S(i,j,k).

As represented in FIG. 2a, the circuit 10 advantageously includes circuits 100, 102 for storing the video component S(i,j,k) of the image signal, i indicating the index of the component sample in the active line of the image in question, j indicates the active line index in the image in question and k indicates the order number of the analyzed image in question.

It will be understood in particular that the circuit 10 comprises an analog-to-digital converter 100 enabling the analog video signal S(i,j,k) to be converted into a corresponding digital signal.

Furthermore, the circuit 10 for measuring the time variance of the composition of the images according to the invention also comprises circuits 101, 102 for storing the component S(i,j,k−1) of the image signal of the image of prior order (k−1) in question.

It may be pointed out, for example, purely by way of illustration, that the delay of an image, in order to store the video component S(i,j,k−1) of the image signal relating to the image of prior order k−1, can be produced by an image-storing circuit placed in "thaw" mode, the "thaw" mode being the mode for real-time acquisition-restitution of a video signal, the delay of an image over the current image being due to internal processing operations.

As also represented in FIG. 2a, the circuit 10 for measuring the time variance of the composition of the images includes a circuit, denoted by 102, for phasing the video signal S(i,j,k) relating to the image of order k and the video signal S(i,j,k−1) relating to the image of prior order k−1, this circuit 102 makes it possible, following the storage of the aforementioned video signals, to read these signals correspondingly, in a synchronous, but shifted manner but the single term of an image, that is to say by the value 1 in the parameter k relating to the order of the successive images.

Such a circuit 102 is a conventional type of circuit and will not be described in detail in the present description. In particular, it will be understood that the aforementioned synchronous reading can be carried out by means of a unit 107, as represented in FIG. 2a, the unit 107 enabling, from the signal relating to the video component S(i,j,k) supplied by the analog-to-digital converter circuit 100 and from an exchange synchronization signal, se, a control signal, scom, to be supplied and the timing of the entire processing of the aforementioned video-digital signals, as described in conjunction with FIG. 2a, to be ensured.

As is furthermore represented in the aforementioned figure, the circuit 10 for measuring the time variance of the composition of the images comprises a circuit 103 for calculating the image difference signal from video component signals S(i,j,k) and S(i,j,k−1), this difference signal being denoted by Sd(i,j,k) and satisfying the relationship:

$$Sd(i,j,k) = A \cdot [S(i,j,k) - S(i,j,k-1)] + Sm.$$

It will be noted that, in general, the calculation of the image difference signal Sd(i,j,k) is performed for each sample of the image by digital processing.

Furthermore, the symbol S indicates, of course, the component of the signal processed, that is to say either the component of the luminance signal Y or the component relating to the color difference signals CR and CB.

In the aforementioned relationship, A indicates a coefficient, which can be taken to be equal to 0.5, and Sm indicates the average level of the permissible dynamic range of the aforementioned component S, the value of the parameter Sm being chosen to be equal to 0.5 when S indicates the luminance signal Y and equal to the value 0 when S indicates a color difference signal CR or CB. The coefficient A can either be a constant coefficient or a function applied to the dynamic range of the luminance signal, such as for example the absolute value of the difference $|S(i,j,k) - S(i,j,k-1)|$.

As is furthermore represented in FIG. 2a, the circuit 10 for measuring the time variance of the composition of the images comprises, in cascade with the circuit 103 for calculating the image difference signal, a filtering circuit 104 enabling the high components of the spectrum of the difference video signal Sd(i,j,k) to be reduced by low-pass digital filtering.

It will be noted that this circuit 104 appears particularly useful in the case when the recorded or broadcast, televised program comes from a cinematographic film transferred to a video medium, the high components of the spectrum of the difference video signal, in this case, corresponding substantially to defects such as scratches or dust particles initially present on the cinematographic film, for example. The filtering circuit 104 also makes it possible to reduce the imperfections of prior video processing operations, such as analog-to-digital conversion, disparity in group propagation times between video components, noise coming from the video tape recorder, quantizing noise during digital coding, without the activity induced by significant inter-image movements being affected. The filtering circuit 104 supplies, at its output, a filtered difference signal denoted by $\hat{S}d(i,j,k)$.

As if furthermore represented in FIG. 2a, the video analysis system, which is the subject of the present invention, includes, at the level of the circuit 10 for measuring the time variance of the composition of the images, a circuit 105 for calculating, for each image of order k, from the image difference signal Sd(i,j,k) and more particularly, preferably as represented in FIG. 2a, from the filtered difference signal $\hat{S}d(i,j,k)$, a histogram, denoted by HSd(k), of the number of occurrences of each amplitude level of the image difference signal, or of the filtered image difference signal supplied by the filtering circuit 104.

The circuit 105 for calculating the aforementioned histogram is next followed by a circuit for calculating corresponding scenic-activity parameters by comparison of the distribution of the spectrum of each histogram HSd(k) relating to each succession of images k−1, k, with a plurality of distributions or reference models representative of corresponding scenic activity.

In the rest of the description, the signal representative of the scenic-activity parameters, consisting of a scenic-activity indicator, is denoted by ias.

It will be considered that, in general, in accordance with the subject of the present invention, the analysis of the image difference signal or of the filtered image difference signal $\hat{S}d(i,j,k)$ is carried out by the formation of the histogram of the distribution of the video levels for the aforementioned image difference signal by calculating, for each video level, the number of samples which have this level in the image in question.

For an aforementioned digital video signal, of the 4-2-2 type, using a coding over 8 bits, there are 256 different values possible for each coded sample. It will be recalled, of course, that the image difference signal Sd(i,j,k) or the signal Ŝd(i,j,k) indicates, on the one hand, the luminance signal and, on the other hand, the two color difference signals mentioned previously in the description.

For a digital level n of a coded sample, n being able to assume any value lying between 0 and N=255, the histogram HSd(k) for the pair of images of order k, k−1 is obtained by calculating, for each value of n, a number equal to the number of times when the coding of a sample of the filtered image difference signal Ŝd(i,j,k) has the value n. Of course, the sum of the 256 coefficients or numbers thus calculated is equal to the total number of samples of the corresponding image difference component on an image in question.

In the case in which the composition of the image does not vary, the case of a fixed image, each sample of the image difference signal is equal to the value Sm given in the previous relationship 1. This characterizes the histogram of the aforementioned distribution of the amplitude levels by a peak for the level associated with the value Sm, all the samples of the image, and by a zero value for the other video amplitude levels.

In the case in which the composition of the image varies slightly, a large proportion of the samples of the image difference signal remains equal to Sm, which is manifested in the histogram by a broadening of the peak centered on the value Sm.

Of course, the greater this variance, the more the number of samples equal to Sm decreases and the more the aforementioned peak subsides.

In the case in which, on the contrary, a rapid break arises in the composition of the images, a break such as for example during a cut shot change, the distribution of the video amplitude levels of the image difference signal is random and therefore does not promote the appearance of a peak centered on the intermediate value Sm.

The histograms relating to the aforementioned case are represented at points 1, 2 and 3 in FIGS. 2, $2b_1$, $2b_2$ and $2b_3$, respectively. The aforementioned histograms correspond to histograms of the amplitude levels of the luminance image difference signal, the axis of the abscissas being graduated in amplitude level from 0 to 255, as described previously, and the vertical axis in a logarithmic scale from 100 to 105.

On the basis of the interpretation of the aforementioned video level histograms of the image difference signal, the circuit 106 enables a corresponding processing operation to be performed in order to synthesize such an item of information.

The principle adopted for carrying out the aforementioned synthesis is to compare the histogram curves with preestablished models, the range of the amplitude levels of the video signal being subdivided into several intervals and a summation of the level counting operations being performed in order to integrate the histogram over the aforementioned zones.

For each level range or interval, the total obtained is next compared with a scale so as to determine a scenic-activity indicator as will be described subsequently in the description.

As regards the embodiment in FIG. 2a, which embodiment uses digital technology, the presence will furthermore be noted of a circuit 108 which enables controlling preselection signals to be generated from, on the one hand, the signal of the video component of two successive images Ŝ(i,j,k), S(i,j,k−1) of the filtered image difference signal Sd(i,j,k) supplied by the filter 104, this circuit 108 enabling a digital controlling signal, denoted by scont, to be supplied, with a view to carrying out tests on this signal, for example. Furthermore, a digital-to-analog converter 109 is provided which makes it possible, from the digital controlling signal scont, to supply a corresponding analog signal enabling the aforementioned control operations to be performed in analog mode.

The implementation of these control signals will not be described as it is not essential for the purpose of the present invention.

It will be noted that the embodiment in FIG. 2a can also be replaced by an embodiment using digital-analog hybrid technology. In such a case, as represented in FIG. 2c, the same elements carry the same references as in the case of FIG. 2a. It will simply be noted that, following the storage of the image of prior row k−1, by the agency of the circuit 101, there can be carried out by means of two circuits, the digital-to-analog conversion circuit 101a, 101b, a conversion into analog signals, on the one hand, of the digital-video signal S(i,j,k) supplied by the analog-to-digital converter 100, and, on the other hand, of the signal of prior order k−1, S(i,j,k−1) supplied by the delay circuit 101. The signals supplied in analog form by the converters 101a and 101b are then supplied to an analog phasing circuit 102, to an analog subtraction circuit 103 and to an analog filtering circuit 104. An analog-to-digital conversion circuit 104a makes it possible, from the filtered image difference signal supplied by the filtering circuit 104, to pass back into a digital signal, the circuits 105 and 106 then being identical to those in FIG. 2a. Finally, it will be noted that the circuits for preselecting the controlling signal can be produced in the form of two circuits 108a and 108b, each enabling the control signal scont to be produced in digital mode and in analog mode respectively.

A more detailed description of the circuit 105 for calculating histograms and of the circuit 106 for calculating the corresponding scenic-activity parameters, that is to say scenic-activity indicators, for each image of order k or pair of images of order k and k−1, respectively, will be given in conjunction with FIG. 2c. Of course, since FIGS. 105 and 106 are identical in the embodiments in FIGS. 2a and 2c, the embodiment in FIG. 3a will be able to be used in one or other of the aforementioned embodiments.

As represented in FIG. 3a, the circuit 105 for calculating, for an image of order k from the image difference signal or from the filtered image difference signal Ŝd(i,j,k), a histogram HSd(k) advantageously includes an input port 1050 for the filtered difference signal Ŝd(i,j,k) connected to an input interface circuit, denoted by 1051, this input interface circuit receiving the aforementioned filtered difference signal, and supplying time reference signals srt, video data signals sdv and clock signals, denoted by clk.

Furthermore, a circuit 1053 generating service signals is provided, this circuit receiving, on the one hand, the time reference signals srt and on the other hand, the clock signals clk, and supplying service signals ss, which enable the video signals, and in particular the signal sdv supplied by the input interface circuit, to be processed.

Furthermore, a circuit 1052 for sorting the video data signals sdv is provided according to a histogram distribution law using video quantising levels.

This sorting circuit 1052 receives, on the one hand, the video data signals sdv, the clock signals elk, the service signals ss as well as sequencing signals slb supplied by a microprogramed sequencing unit 1061, which will be described subsequently in conjunction with the description of the circuit 106. The circuit for sorting the video data signals sdv supplies video data signals sorted by level sdvtn, according to a criterion for formation of the histogram which will be described subsequently in the description.

Furthermore, as represented in FIG. 3a, the circuit 105 for calculating the histogram comprises a plurality of storage registers, denoted by 1054-0 to 1054-3, each register, intended to receive and to store the video data signals sorted by level or by level range, sdvtn, as a function of the levels of these signals, forming a bank of sorted-level values.

An adder circuit 1055 is provided so as to perform the down-count in each bank, that is to say in each register 1054-0 to 1054-3 of the number of occurrences of the amplitude levels of the sorted video signals. This adder circuit 1055 is connected via a read-BUS data-link, denoted by BUS-L, and via a write-BUS data-link, denoted by BUS-E, to each of the registers forming a bank.

As regards the circuit 106 for calculating the scenic-activity parameters, this circuit, as represented in FIG. 3a, comprises an input port 1060 and a microprogramed sequencing unit 1061 connected to the aforementioned input port 1060. The microprogramed sequencing unit 1061 receives the time reference signal srt and supplies an access signal to the banks, that is to say to the registers 1054-0 to 1054-3, this access signal being denoted by slb and corresponding to a signal for reading the aforementioned banks as will be described subsequently in the description.

The circuit 106 also includes a buffer register, denoted by 1062, interconnected via the read BUS-L to each of the registers 1054-0 to 1054-3. This buffer register comprises, on the one hand, an auxiliary memory circuit enabling the bank read signal relating to each bank to be stored and, on the other hand, a conversion table. This conversion table supplies, from the bank read signal, a scenic-activity indicator signal for the pair of successive images of order $k-1$, k in question, as will be described subsequently in the description. However, it will be noticed that the aforementioned conversion table can be localized at the level of the microprogramed unit and can be chosen from Q preprogramed tables or established according to given criteria, self-analysis, forcing or the like. Finally, it will be noted that the circuit 106 includes a communication register 1063 which is connected, on the one hand, to the microprogramed sequencing unit 1061, to the buffer register 1062 via a BUS-type data-link, and, on the other hand, to a first port 1064 receiving the exchange-synchronization signal se or the control signal scom and to a second port 1065 supplying a scenic-activity indicator signal ias.

The operation of the circuits 105 and 106, which carry out respectively the calculation of the histogram HSd(k) and the calculation of the scenic-activity parameters, as represented in FIG. 3a, will be explained in conjunction with FIGS. 3b and 3c.

A histogram of the levels of the digital signal representing the inter-image luminance differences, for example, is represented in FIG. $3b_1$. The histogram represented in FIG. $3b_1$ is a priori arbitrary.

Figures 3, 3C, 4:
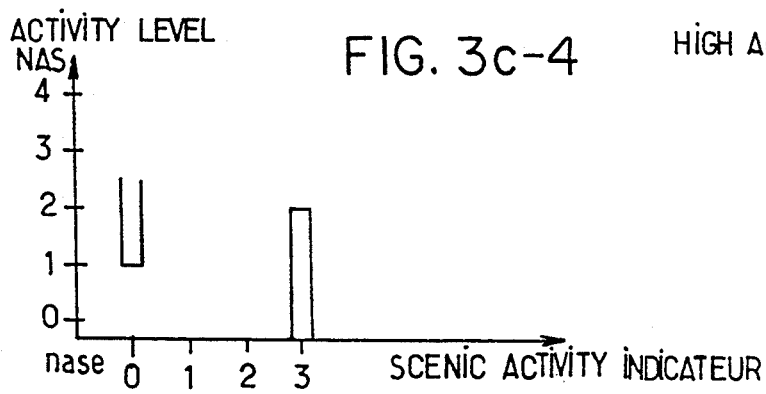

In FIG. $3b_2$ is represented the distribution of the levels in the banks and, in the particular non-limiting example shown, and of the embodiment in FIG. 3a, 4 banks centered on the zero difference. It will be noted, for example, that the width of each bank depends on the number of banks and on a parameter assignment connected with the nature of the images. As will be noted in FIG. $3b_2$, to each sorted-level value bank are assigned values which are symmetrical with respect to the level of amplitude value corresponding to that of the average luminance Sm.

Thus, a first bank, bank 0, is assigned a continuous range of values which are symmetrical with respect to the average luminance amplitude level, this average luminance level being identified by N/2 and n, the value of the coded samples, varying from 0 to $N=255$ for a coding over 8 bits, as mentioned previously.

2 ranges of discrete values, which are symmetrical with respect to the amplitude level of the average luminance N/2, are assigned to each of the other banks. Thus, the spectrum of the histogram HSd(k) is expressed by bank count-down signals, denoted by sdb(0,1,2,3), each relating to the bank in question. Each bank count-down signal represents, in fact, the number of amplitude signals lying within the corresponding range of amplitude values associated with the bank in question.

Thus it will be observed that, in FIG. $3b_2$, a range of values, which are continuous and symmetrical with respect to the value N/2, is assigned to the first bank, denoted by bank 0, two ranges of discrete values of symmetrical values are assigned to the second bank, denoted by bank 1, these two ranges being adjacent to the central-value range associated with the first bank, two ranges of separate values of symmetrical values are associated with the third bank, denoted by bank 2, these two ranges themselves being respectively adjacent to the two ranges of discrete values associated with the second bank, and 2 ranges of discrete values of symmetrical values are associated with the fourth bank, denoted by bank 3, these two ranges themselves being respectively adjacent to the two ranges of discrete values associated with the third bank.

According to a particularly advantageous aspect of the system, which is the subject of the present invention, as represented in FIG. $3b_3$, the bank count-down signals sdb(0,1,2,3), each representative of the number of occurrences N0 of the amplitude signals corresponding to those of the range associated with the bank in question, are quantized onto a number NAS of scenic-activity levels, so as to define, for each bank, a quantized elementary scenic-activity level, nase(0,1,2,3). As represented in FIG. $3b_4$, the set of the quantized elementary scenic-activity level signals, nase(0,1,2,3), then forms the components of a vector in fact constituting the scenic-activity indicator, ias, for the pair of images of order $k-1$, k in question. Each component of the vector constituting the scenic-activity indicator, ias, has a value nase(0,1,2,3) referenced in terms of scenic-activity level value, NAS, including for example 5 levels, NAS indicating the maximum scenic-activity value.

According to another particularly advantageous characteristic of the system, which is the subject of the present invention, the scenic-activity indicator, ias, as represented in FIGS. $3c_1$ to $3c_4$, is representative of the absence of scenic activity, of a low scenic activity, of a medium scenic activity and of a high scenic activity.

As represented in FIG. $3c_1$, the absence of scenic activity constituting a corresponding decision model is defined by an elementary scenic-activity level relating to the first bank nase(0), greater than the average value NAS/2 of the scenic-activity levels, nase(0)≧NAS/2, the elementary scenic-activity level relating to the second, third and fourth banks being substantially zero, i.e. nase(1,2,3)=0.

As represented in FIG. $3c_2$, the low scenic activity, constituting a decision model of the scenic-activity level, is defined by an elementary scenic-activity level relating to the first bank, nase(0), greater than the average value NAS/2 of the scenic-activity levels, i.e. nase(0)≧NAS/2, the elementary scenic-activity level relating to the second bank being less than 1, nase(1)≦1, and the elementary scenic-activity level relating to the third and to the fourth banks being substantially zero, i.e. nase(2,3)=0.

As represented in FIG. $3c_3$, the medium scenic activity is defined by an elementary scenic activity level relating to the first bank, greater than the average value NAS/2 of the scenic-activity levels, the elementary scenic-activity level relating to the second and to the third banks being less than or equal to 1, i.e. nase(1,2)≦1, and the elementary scenic-activity level relating to the fourth bank being substantially zero, i.e. nase(3)=0.

As represented in FIG. $3c_4$, the high scenic activity is defined by an elementary scenic-activity level nase(0) relating to the first bank less than or equal to the average value NAS/2 of the scenic-activity levels, i.e. nase(0)≦NAS/2, or by an elementary scenic-activity level, relating to the fourth bank, greater than or equal to the average level NAS/2 of the scenic-activity levels, i.e. nase(3)≧NAS/2.

The operation of the circuits 105 and 106, as represented in FIG. 3a, can then be illustrated as follows: on transmission of the filtered image difference signal $\tilde{S}d(i,j,k)$ via the input port 1050, the input interface 1051 successively supplies the various samples in order to give the video data signal sdv. On sequencing, by the microprogramed sequencing unit 1061, the circuit 1052 sorts the data and transmits the sorted video data signal, sdvtn, as a function of the amplitude of the samples of the signal sdv, to the register 1054-0 to 1054-3, with which the amplitude range constituting the bank, as defined previously, is associated. The adder 1055 then enables the down-counting, in each corresponding register and therefore in each bank, of the present and stored samples, the aforementioned adder generating the corresponding bank down-count signal, sdb(0,1,2,3), which is recorded in the register 1054-0 to 1054-3 associated with the aforementioned bank. At each new triggering by the microprogramed sequencing unit 1061, by the agency of the circuit for sorting the data and for managing the banks 1052, the bank down-count values stored in each register associated with each bank are read, the bank down-count signal, sdb(0,1,2,3), previously stored in the corresponding register, being transmitted via the read-BUS, BUS-L, to the buffer register 1062. Under the control of the microprogramed sequencing unit, on the one hand, a bank down-count signal, sdb(0,1,2,3), is stored by the aforementioned buffer register and then converted via the conversion table so as to generate, from the bank down-count signal, the scenic-activity indicator signal as described in conjunction with FIGS. $3b_3$ and $3b_4$, and FIGS. $3c_1$ to $3c_4$ for a successive image pair of order k−1, k in question.

The circuit 11 for analyzing the recorded or broadcast program then permits the processing to continue.

As is furthermore represented in FIG. 1, the circuit 11 for analyzing the recorded or broadcast program makes it possible, from the image difference signal and more particularly from the corresponding parameters representative of the scenic activity, to receive the exchange-synchronization signal, se, the scenic-activity indicator signal, denoted by ias, the method of obtaining which was described previously in the description, these two first signals being supplied by the circuit for measuring the time variance of the composition of the images carrying the reference 10, and the time code signal, denoted by ct, supplied for example by the video tape recorder M.

In general, it will be understood that the circuit 11 for analyzing the recorded or broadcast program comprises a calculator circuit 110 which is interconnected with the circuit 10 for measuring the time variance of the composition of the images, and which receives the three signals, se, ias and ct, described previously.

The calculator circuit 110 enables the scenic-activity parameters to be stored and includes discrimination software making it possible to select the images of order k which are in question or the groups of p images, the scenic-activity parameters of which are greater than one or more predetermined threshold values. The aforementioned software makes it possible to establish time and/or cardinal data representative of the cutting-up into shots, consisting of p successive constituent images of the recorded or broadcast, televised program. Of course, it will be understood that, in accordance with the standard for transmitting the images of a recorded or broadcast, televised program, such as the 4-2-2 standard for example, the aforementioned time date may easily be converted into cardinal data corresponding to the image numbers for example.

An illustrative description of the operating mode of the aforementioned software will be given in conjunction with FIGS. $4a_1$ to $4z_3$ FIG. 4b.

The exchange-synchronization signal, se, enables data corresponding to the time code signal and to the scenic-activity signal, ias, to be acquired, at the image frequency, by the calculator circuit 110.

The discrimination software makes it possible, using as discrimination criterion the scenic-activity indicator as described previously in conjunction with FIGS. 3b and 3c, for every image of order k or group of p images of order k-(p-1,k), to determine the editing points of this program, these editing points corresponding to two successive shots P−1,P. According to an advantageous embodiment, as represented in FIGS. $4a_1$ to $4a_3$, the discrimination criterion is established for example with respect to 3 standard shots of noteworthy scenic activity.

A first standard shot of scenic activity, such as the passage from one person to another person in a dialogue situation, is indicated by cut shot, this type of shot having, as represented in FIG. $4a_1$, an abrupt time variation of scenic activity. In particular it will be understood that the abrupt time variation of scenic activity is characterized by the slope of this variation and not by its amplitude, over a small number of images, lying between 5 and 10 for example.

A second standard shot, indicated by lap-dissolve shot and represented in FIG. 4a$_2$, has a scenic activity with a substantially linear time transition, the lap dissolve being characterized by a range of slope values for a number of images much greater than the scenic-activity transition corresponding to the aforementioned cut shot, that is with respect to the number of images of the order of 10.

A third standard shot, indicated by overlay shot, as represented in FIG. 4a$_3$, has a pulse-type time variation of scenic activity, the aforementioned standard shot then being characterized by a very rapid variation, less than or equal to 2 images in duration, of the scenic-activity level.

It will be understood that, in general, the aforementioned standard shots are defined by the value of the scenic-activity indicator and the value of scenic-activity which are predetermined, as described previously in relation with FIG. 3c and the comparison of the variance of this activity over a number of given images, as described previously.

Thus, the calculator circuit 110, by virtue of the use of the aforementioned software, enables a signal to be supplied which is representative, for the corresponding broadcast program, of its cutting-up into shots, this signal being denoted by srdp in FIG. 1. Each shot of row p is thus defined, as represented in FIG. 4b, by a start time-code and an end time-code. Of course, it will be noted that, following the corresponding processing, the start time-code of a shot P corresponds to the end time-code of the prior shot P−1. Of course, the aforementioned signal can also include a code relating to the order of the predetermined shots and, if necessary, a code relating to the number of constituent images p of each shot. Of course, the signal srdp can then be stored and formed as a file, as has already been pointed out in the description.

It will be noted that the video analysis system for editing a recorded or broadcast, televised program, which is the subject of the present invention, previously described in the description, thus enables the set of time codes relating to shot changes arising in the editing of the aforementioned program to be used automatically, this program having been recorded on a video medium for example.

Thus, a large part of the laborious tasks of manual shot locating by viewing by a human operator can be delegated to the aforementioned system, which provides a saving in time and a saving in post-production costs for example.

With the aim of being able to be easily exploited in currently existing post-production installations, the video analysis system, which is the subject of the present invention, can be endowed with a computer communication interface circuit so as to permit the transmission of the aforementioned information and especially of the files constituted by the signal representative of cutting-up into shots to a wide range of equipment, such as microcomputers, editing stations, colorization stations or the like.

As will be described hereinbelow in the description, the video analysis system, which is the subject of the present invention, may be used so as to establish the comparison between various different versions of the same program automatically.

Such a use may be performed by correlation between the leaders relating to the various versions.

Such a use will more particularly be described in conjunction with FIG. 5a and the following figures.

The equipment necessary for the implementation of the aforementioned is represented in FIG. 5a. It will be noted in particular that the aforementioned equipment is configured in the following manner: several video tape recorders, denoted by M1 to ML, these video tape recorders being interconnected with the video analysis system for editing a televised program, denoted by 1, as previously described in conjunction with the present description. The video analysis system 1 is interconnected with a module 2 for virtual post-synchronization of the programs. The aforementioned use will more particularly be described in an application for the creation of multilingual, recorded or broadcast, televised programs from various monolingual versions. The combination of the video analysis system 1 and the module 2 for virtual post-synchronization of the programs is represented in FIG. 5a by a single functional unit, denoted by 3, this unit being supposed to supply a virtual post-synchronization signal, denoted by spsv, which can be used directly by a program composition module 4, as will be described hereinbelow in the description.

In general, and with a view to producing a composition of multilingual-narrative televised programs by post-composition of monolingual-narrative programs, these monolingual narratives forming the attributes of common video images of the same program, the aforementioned use consists in performing an analysis step of each monolingual program in order to establish the data representative of the cutting-up into shots consisting of a group of pl successive images, where pl indicates, for the monolingual version 1 in question, the number of constituent images of a corresponding shot Pl. Of course, in FIG. 5a the monolingual versions, Vl, V1 to VL, are transmitted sequentially for example by each corresponding video tape recorder M1.

A systematic correlation between the various shots Pl of each monolingual version, each consisting of a predetermined number pl of successive images for each monolingual version Vl in question, is carried out so as to establish a time coherence between all the shots Pl of each monolingual version and each monolingual narrative. Of course it will be understood that this correlation enables the time and/or cardinal data to be adopted, in terms of minimum and maximum number of successive images, pl, constituting a given shot, Pl, enabling all the monolingual narratives in question to be carried. The data coming from the aforementioned correlation are then stored in vector form (Pml, Pl1, pl1, ..., Plt, plt, ..., Pln, pln) so as to constitute a multilingual-program editing or composition frame in which, in the order of each shot Pml which can go back into the composition of the final multilingual program are associated, for each monolingual version 1, 1 representing the order of the monolingual version in question, the order of the shot Plt, the number of successive images, plt, and the time data for the start and end of the shot Plt in question. In FIG. 5a, the multilingual-program composition frame is represented by the signal for virtual post-synchronization of the multilingual programs, which signal is denoted by spsv, which is just a sequential list of shots without a definitively established relationship, as will be described subsequently in the description.

The operating mode of the module 2 for virtual post-synchronization of the multilingual programs will be described in conjunction with FIG. 5b.

As pointed out in the aforementioned FIG. 5b, the module 2 comprises a calculator, such as a microcomputer for example, interconnected at the output of the circuit 11 for analyzing the recorded or broadcast program, as represented in FIGS. 1 and 5a.

The calculator, denoted by 20, comprises software developed so as to establish the relationships, shot to shot, between the various versions analyzed and thus to simplify the locating work for editing the editing instructions of the final product.

The principle used for establishing these relationships between shots rests on a comparative analysis, version to version, of the distribution over time of the duration of the identified shots.

So as to remove the uncertainty which may arise as regards the determination of the relationships between shots, for example when consecutive shots have closely similar durations, a procedure can be used which consists in a real-time calculation of signatures relating to the composition of the video signal before and after the detection of a shot change. These signatures are in the form of digital data and are transmitted to the calculator 20 during a step for acquiring the analysis data. They can be used so as to automatically validate the result of the identification of the relationships, shot to shot, between versions, Vl, in question.

The signal representative of the cutting-up operations into shots, srdp, relating to each monolingual version, Vl, especially comprises the series of time codes which corresponds to a shot-change detection, as represented previously in FIG. 4b.

The processing software then makes it possible to use, in delayed-time for example, the files of corresponding raw data of the signal srdp so as to automatically establish the editing divergences between the various versions of the same film.

The aforementioned software is composed of 3 phases:

a preparatory phase during which, for each monolingual version Vl, the raw-data file relating to the monolingual version V1 in question is processed, a phase for putting the shots into relationship, during which phase the relationships, shot to shot between two versions, are established, a final phase which supplies, for the set of monolingual versions V1 in question, which are in intended to form the multilingual version, the sequential list of the shots without a definitively established relationship between corresponding monolingual versions. The sequential list of the shots is indicated by the signal for virtual post-synchronization of the multilingual programs, spsv, the virtual character of the post-synchronization resulting from the fact that the relationship established between the shots is not necessarily definitive.

For each monolingual version, the preparatory phase consists in processing and structuring the file of raw data, srdp, obtained previously.

Thus, the aforementioned preparatory phase comprises a step for complementary filtering of the raw data, that is to say of the signal representative of the cutting-up into shots, srdp, in order to generate a corresponding filtered signal representative of the cutting-up into shots, srdp. By means of the filtering operation in question, an operator has the possibility to define decision thresholds which are more restrictive than those used during the phase for acquiring the raw data. The file is processed in order to eliminate the time codes when the level of the scenic-activity indicators does not correspond to the new filtering criteria.

The aforementioned filtering step is followed by a step for calculating the duration of the shots and of the transition shots by subtraction of the successive time codes, ct. The duration of the shots is denoted by DUR and the duration of the transition shots is denoted by TRANS.

This duration can be expressed in terms of number of images.

It will be noted that a rapid movement in a sequence of images can generate, for example, a succession of time codes, each spaced apart by one image and, consequently, a succession of shots of a duration equal to one image.

According to a characteristic of the use, which is the subject of the present invention, these short-duration shots, that is to say, less than 10 images for example, are withdrawn from the initial list of the shots, that is to say from the signal srdp obtained as output of the analysis system, which is the subject of the invention, as represented in FIG. 1, in order to be considered as transition shots. Advantageously, this succession of shots constituting a transition shot is arbitrarily associated with the preceding shots, the duration of which is greater than 10 images.

Thus, each shot is identified, on the one hand, by its own duration DUR, and, on the other hand, by the duration of the transition shot associated with this shot, the duration of which is denoted by TRANS.

So as to simplify the establishment of the relationships, shot to shot, between monolingual versions Vl, the use, which is the subject of the present invention, comprises a step for calculating and assigning, to the first shot of each monolingual version Vl, a virtual tme code, TCIV, or arbitrary value and, by recurrence, for each subsequent successive shot P1, a virtual time code, expressed in number of images, satisfying the relationship:

$$TCIV(P1) = TCIV(P1-1) + DUR(P1-1) + TRANS(P1-1).$$

It will be noted that in this relationship, P1 indicates the shot number of the monolingual version 1 in question.

The aforementioned step is then followed by a step for creating a signal representative of the cutting-up into processed shots, this signal consisting, of course, of files, as mentioned previously in the description. This signal is indicated by srdpt. It will be noted that this signal, or file, allows the identification of each shot P1 and contains, in addition to the real time code, a shot number, the duration of the corresponding shot expressed for example in number of images, the duration of the associated transition shot and a virtual time code TCIV. A file representing the signal srdpt in an analog manner is given by the following table.

TABLE 1

| OUTPUT FILE OF THE PREPARATORY PHASE. | | | |
|---|---|---|---|
| SHOT No. | DUR | TRANS | TCIV |
| 1 | 200 | 0 | 10 000 |
| 2 | 100 | 7 | 10 200 |
| 3 | 500 | 0 | 10 307 |
| . | . | . | 10 807 |

A more detailed description of the establishment of the systematic correlation between the various shots of each monolingual version will now be given in conjunction with FIGS. 6a, 6b, 6c.

In general it will be considered that, for a number L or monolingual versions, the correlation is performed by group of 2 monolingual versions. This correlation between successive shots P1, P1+1, of two monolingual versions V1, V1+1, is performed by comparative analysis of the duration and/or of the corresponding number of images p1, p1+1, for the shots in question, or of a linear combination of these durations or of the numbers of successive images over a predetermined number of successive shots P1, P+1,1, . . . , P+rl; P1+1, P+1,1+1, . . . , P+r,1+1 of both monolingual versions V1, V1+1 in question.

Thus, for a shot of given duration of the version V1 for example, a shot of equal or approximately equal duration is sought in the other version V1+11.

In general, the step for establishing the aforementioned correlation may consist, from the signal representative of the cutting-up into processed shots, srdpt, in performing a putting-into-relationship operation, shot by shot, by comparison of the duration DUR of the corresponding shots P1; P+r,1+1, of the two monolingual versions V1, V1+1 in question.

This comparison is preferably performed by concatenation of elementary comparison steps based on a constraint criterion of equality of the shot durations DUR and/or the transition durations TRANS of the transition shots, this equality constraint being more or less strict.

The quality of the results arising from the processing in the phase for putting the shots into relationship rests on the nature of the comparison algorithms and on their scheduling. Thus, a comparison algorithm which is limited to the simple equality of shot duration is capable of putting into relationship shots of strictly identical durations but of different contents.

Thus, at the start of the phase for putting shots into relationship, the high-equality-constraint comparison routines are called up.

The strongest equality constraint is produced by a strict equality allocation of the shot, DUR, and transition shot, TRANS, durations for three consecutive shots in each of the two versions V1, V1+1.

A comparison algorithm with strict equality criterion for 3 consecutive shots is given in FIG. 6a for two versions, version 1 and version 2, corresponding to l=1.

For the aforementioned version 1 and version 2, we consider:

TABLE 2

| VERSION 1 | | VERSION 2 |
|---|---|---|
| Shot P−1 (previous shot) | | M−1 |
| Shot P | | M |
| Shot P+1 (next shot) | | M+1 |
| The putting of shot P of V1 into relationship with shot M of V2: | | |
| DUR (P−1) | = DUR | (M−1) AND |
| TRANS (P−1) | = TRANS | (M−1) AND |
| DUR (P) | = DUR | (M) AND |
| TRANS (P) | = TRANS | (M) AND |
| DUR (P+1) | = DUR | (M+1) AND |
| TRANS (P+1) | = TRANS | (M+1) |

Consequently, various algorithms may then by concatenated, such as those for equality allocation between two consecutive shots, equality between the sum of three consecutive shots and one shot, equality between the sum of two consecutive shots and one shot, and simple equality.

Furthermore, it will be noted that each of the comparison algorithms can be activated with a precision criterion of greater or lesser constraint:
 strict equality of DUR and TRANS,
 very close equality within 1 to 2%,
 close equality within 3 to 5%.

This precision criterion enables a fuzzy-logic decision criterion to be introduced. Examples of comparison algorithms over 3 consecutive shots are given in FIGS. 6a, 6b and 6c, FIG. 6b corresponding to a strict equality criterion for the shot P and with a close or very close equality criterion for the two neighboring shots, whereas FIG. 6b corresponds to a comparison algorithm with a close or very close equality criterion for 3 consecutive shots.

According to a further advantageous characteristic of the use, which is in accordance with the subject of the present invention, for each elementary comparison, the comparison is performed on a search window constituting, for a shot P1 of order P of the version V1, a reduced environment of s shots, P1+1 to P+sl+1 of the version V1+1.

The creation of this search window is justified by the fact that 2 shots capable of being put into relationship have an adjacent position in their respective files. The shots located at the start of a file in one version will also be located at the start of a file in the other version.

Thus, by virtue of the creation of the search window, the most probable shot is sought in a reduced environment of shots of the version 2 for any shot of the version 1. The search window is determined in value by the value of the virtual time code of the version 1, modulated by the width of the search window.

According to another particularly advantageous aspect of the use, which is the subject of the present invention, the putting of two shots, respectively P1 and P+sl+1, into relationship is immediately followed by a relative reframing of the shorter virtual time code TCIV of the two monolingual versions V1, V1+1 in question. Furthermore, the virtual time code of the next shots of the version, the virtual time code of which has been re-updated, is also re-updated until the recognition of an already re-updated virtual time code.

It will be noted in particular that this virtual time code re-updating in the two monolingual versions being compared, V1, V1+1, corresponds to a systematic film- or program-portion reframing, an example of which is given hereinbelow in the description. Finally, it will be noted that as the number of shots put into relationship is increased, so the width of the search window is then reduced.

An example of systematic reframing of film portions is given hereinbelow in relation with Tables 3, 4 and 5:

TABLE 3
BEFORE SHOTS HAVE BEEN PUT INTO RELATIONSHIP

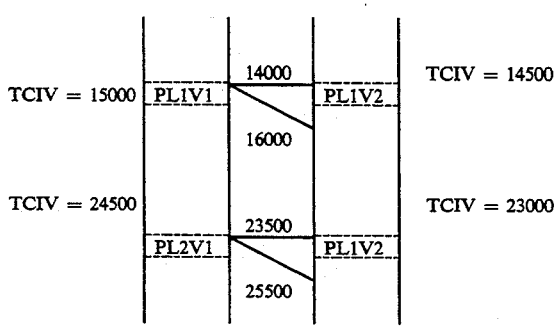

The TCIV of the shot PL1V2 is in the search window (14,000, 16,000). PL1V2 is put into relationship with PL1V1. The PCIV are updated.

TABLE 4
AFTER THE FIRST PUTTING OF SHOTS INTO RELATIONSHIP.

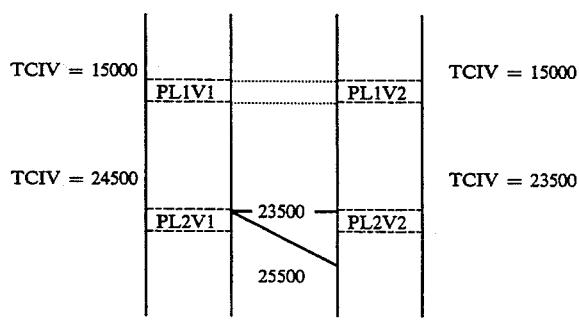

The TCIV of the shot PL2V2 is in the search window (23,500, 25,500). PL2V2 is put into relationship with PL2V1. The TCIV are updated.

TABLE 5
AFTER THE SECOND PUTTING OF SHOTS INTO RELATIONSHIP.

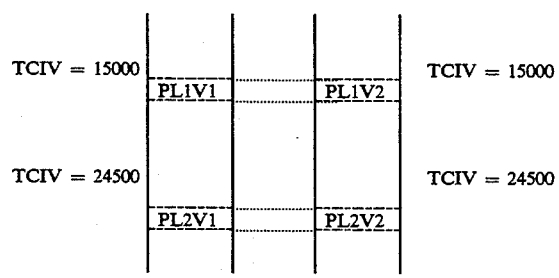

The possible incidents specific to each version, cutting, etc., require a relatively large search window when the first comparison algorithm is called up.

Experimental studies have enabled it to be established that a comparison between two versions of a closely similar total duration required an initial search window of 3 to 4 minutes (that is 4,500 to 6,000 images), whereas a significant disparity greater than or equal to 15% in the total durations of the two versions requires a window of the order of 10 to 15 minutes (that is 15,000 to 22,500 images).

It will be noted that the width of the search window, connected with the comparison algorithm imple- mented, then varies from two minutes to the order of ten seconds.

In Europe, for the 25 images/second 625 line standard, the film-video transcription is produced by an analysis of the film at 25 images per second.

For the 30 images/second 525 line standard, the film-video transcription is produced at 24 images per second. The duration of the same film is thereby increased in the ratio 25/24. The values of the file coming from the preparatory phase, that is to say, the signal sdrpt comprising the parameters DUR, TRANS, TCIV, are then assigned an inverse correcting coefficient of 24/25. Of course, the version or versions to be processed are determined by successive trials.

A general flow chart relating to the execution of the step for putting into relationship the shots for two monolingual versions V1 indicated by version 1 and version 2 is given in FIG. 7.

A first step, denoted by 1000, calls up the original signals relating to each version 1 and 2, these original signals being just the corresponding signals, srdpt, representative of the decomposition into corresponding processed shots.

A step 1001 then enables the comparison algorithm to be selected, an algorithm such as described previously in relation with FIG. 6a to 6c for example. The step 1001 thus makes it possible to obtain a sequential list of the shots capable of being put into relationship with a step 1003, after a step 1002 for activating the chosen comparison algorithm. A test 1004 relating to the existence of a corresponding empty list makes it possible, by a test 1016 for determining the call-up of the last algorithm from the algorithm library, to pass, on a positive response to the test 1016, to subsequent steps which will be described hereinbelow in the description, and on a negative response to this same test, to return to the step 1001 for selecting the comparison algorithm.

On a negative response to the test 1004, without the list obtained following the implementation of the step 1003 being empty, a step 1005 is provided for sequentially analyzing the list, shot by shot, as described previously in the description.

The putting into relationship, shot by shot, can, for example, as represented in FIG. 7, comprise a step 1006 for calling up the first shot of the version 1, for example, taken as a reference, and for the implementation of the procedure for determining, over the search window, coincidence of all the shots of the search window of the version 2. The aforementioned step 1006 is followed by a step 1007 for determining the presence of doublets, that is to say the coinciding, in the current search window, of two shots of the version 2 with one shot of the version 1.

On a negative result to the test 1007, a step 1008 is provided for checking validity of the shot numbers, the latter being followed by a step 1009 for checking validity of the shot, for example by means of the signature-implementing procedure previously described in the description. On a positive response to the test 1009, the latter is followed by a step for establishing the relationship of shots in the original lists of the versions 1 and 2. The two coincident shots are then considered to be in relationship.

On a positive response to the test 1007, a step 1010 is provided for processing the doublets. On a positive response to a test 1011 for validating the shot, the previously described step 1012, for establishing the relationship of shots in the original lists of the versions 1 and 2, is carried out. A negative response to the tests 1009 and 1011 for validating the shot permits, as well as following the aforementioned step 1012, the calling up of an end-of-list test 1013, a negative response to the test 1013 permitting the return to the next shot of the reference version, that is to say the version 1, by the step 1014 and the return to the phase for putting the shots into relationship. A positive response to the end-of-list test 1013 enables a test 1015 for reactivating the algorithm to be called up. On a positive response to the test 1015, a return to the step 1002 for activating the comparison algorithm is provided, while on a negative response to this same test 1015, there is provision for passing to the last-algorithm test step 1016 previously mentioned in the description. The positive response to the aforementioned test 1016 makes it possible to pass to a step 1017 for checking validity of the shot numbers and then to a shot-reversal algorithm step 1018 which is itself followed by an end step.

A more detailed description of the step for controlling validity of the shot numbers will be given hereinbelow.

The shots put into relationship with algorithms having weaker equality constraints require a validity check so as not to link shots with different contents. This check is carried out by the analysis of the shot numbers newly put into relationship with respect to the previously identified adjacent shots. By way of non-limiting example, the putting of shots of the version 1 and the version 2 into relationship is recognized as being valid if the shot number in each of the two versions is flanked by two smaller shot numbers and by two larger shot numbers.

The validity check of the shot numbers with respect to their environment in fact excludes the facility for putting reversed shots into relationship. Consequently, a special processing operation manages the reversal of shots, this processing operation being implemented at the end of the phase for putting shots into relationship at the shot-inversion algorithm step 1018. By means of this step, the shots put into relation, whose number does not follow the logical shot-numbering order, are withdrawn from the shot list. The step 1010 for processing the doublets is called when, at a shot of the version 1, called the reference version, a relationship can be established with two or more shots of the version 2. The indeterminancy as regards the probable shot to be associated with the shot of the version 1 can in the majority of cases be removed by virtue of the analysis of the numbers of adjacent shots.

An example of signals or lists obtained coming from the phase for putting shots into relationship between versions is given in the following Tables 6 and 7:

TABLE 6

VERSION 1: LIST OF THE SHOTS OF THE VERSIONS 2, 3, 4 AND 5 PUT INTO RELATIONSHIP WITH THE SHOTS OF THE VERSION 1.

| VERS. 1 SHOT No | DUR | TRANS | VERS. 2 SHOT No | VERS. 3 SHOT No | VERS. 4 SHOT No | VERS. 5 SHOT No |
|---|---|---|---|---|---|---|
| 1 | 100 | 0 | 1 | 1 | | |
| 2 | 53 | 0 | 2 | 2 | | |
| 3 | 125 | 0 | 3 | 3 | | 6 |
| 4 | 234 | 2 | 4 | 4 | 4 | 7 |
| 5 | 45 | 0 | 5 | 5 | 5 | 8 |
| 6 | 34 | 0 | 6 | 6 | 6 | 9 |
| 7 | 567 | 0 | 7 | 7 | | 10 |
| 8 | 41 | 4 | 8 | 8 | 8 | |
| 9 | 12 | 5 | 9 | 9 | | |
| 10 | 32 | 0 | 10 | 10 | 10 | 11 |
| 11 | 267 | 0 | 11 | 11 | 11 | 12 |
| 12 | 672 | 1 | 12 | 12 | 12 | 13 |
| 13 | 89 | 1 | 13 | 13 | 13 | 14 |

All the shots of the versions 2 and 3 were able to be put into relationship with all the shots of the version 1.
The shots 1, 2, 3, 7 and 9 of the version 4 were not able to be put into relationship with those of the version 1.
The shots 1, 2, 3, 4 and 5 of the version 5 were not able to be put into relationship with those of the version 1.
The shots 8 and 9 of the version 1 are not present in the version 5 (cutting).

TABLE 7

VERSION 5: PARTIAL VIEW OF THE SHOTS OF THE VERSION 5

| SHOT No VERS. 5 | DUR | TRANS | SHOT No VERS. 1 | ALGORITHM INDICATOR USED |
|---|---|---|---|---|
| 1 | 23 | 0 | | |
| 2 | 112 | 0 | | |
| 3 | 15 | 0 | | |
| 4 | 12 | 2 | | |
| 5 | 65 | 0 | | |
| 6 | 125 | 0 | 3 | 2 shots, strict equality |
| 7 | 234 | 2 | 4 | 3 shots, strict equality |
| 8 | 45 | 0 | 5 | 3 shots, strict equality |
| 9 | 34 | 0 | 6 | 3 shots, strict equality |
| 10 | 565 | 1 | 7 | 2 shots, very close equality |
| 11 | 35 | 0 | 10 | 2 shots, close equality |
| 12 | 269 | 0 | 11 | 3 shots, very close equality |
| 13 | 672 | 1 | 12 | |

Each file, one per version, essentially contains the list of the shots put into relationship between the version in question and the other versions.

Finally, the final phase of the software loaded into the calculator 20 makes it possible to terminate in the phase for generating the sequential list of the shots without a definitively established relationship, that is to say the list of the shots which it has not been possible to make coincide.

The final phase now enables the difference in duration existing between these shots to be determined in order to establish a new file, which will enable the signal spsv of FIG. 5a, or the sequential list of the shots without a definitively established relationship, to be generated.

For the shots put into relationship, the difference in duration between two shots is:

$\Delta = (DUR + TRANS)$ of $V2 - (DUR + TRANS)$ of $V1$.

The duration calculation is conducted as a function of the algorithm used for putting shots into relationship:

algorithm with strict equality criterion: Δ=0, algorithm with very-close or close equality criterion: Δ is calculated according to the aforementioned relationship.

For a sum algorithm, the calculation of Δ is extended to the two or three shots composing the sum.

Finally, for the non-identified shots, the difference in duration is calculated, on each series of shots not put into relationship, by subtraction of the extreme real time codes.

The corresponding file or signal spsv previously described may then be used in order to produce, by means of the module 4 represented in FIG. 5a, a composition of the coherent program for the set of image and sound sources of the aforementioned monolingual versions Vl.

The use, in accordance with the subject of the present invention, will be described with a view to producing the composition of multilingual-narrative televised programs by composition of L monolingual-narrative programs, attributes of common video images of the same program.

In such a use, the post-composition operation consists, from the various versions Vl constituted by the video signal ViVl relating to the version Vl, and a corresponding audio signal denoted by AuVl, as well as from a composition frame constituted in fact by the signal spsv and from one of the versions taken as the reference version, the version 1 for example, in performing a video post-synchronization between the video signals of the reference version and each other version.

Two shots, or groups of shots, P1, Pl, with l≠1, of the reference version and of the version subjected to synchronization, are synchronous when the difference in duration of the two shots, or groups of shots, put into relationship is zero.

The post-synchronized shot is obtained by selection and storage of one of the corresponding video signals, that is to say signals AuVl, AuVl, with l≠1. These signals are synchronized respectively to their corresponding version, including their sound-track information. Such an operating procedure enables L-1 pairs of post-synchronized versions to be constituted.

A two-by-two comparison of the difference in duration of the pairs of post-synchronized shots is performed in order to determine, by intersection, the shots which require no intervention. An analog illustration of the determination of these shots requiring no intervention is given in the table hereinbelow:

ences may be compensated for either by suppression of the longest-duration audio signal or by external intervention by a human operator.

The mode of operation of the previously described module 4 is thus rendered completely automatic although, if required, maintained under the initiative of the human operator.

Of course, the manual intervention of a human operator is useful when the synchronization between versions has not been able to be completely performed in automatic mode.

These manual intervention operations may consist, by means of viewing and listening, in validating synchronization propositions when series of shots have not been able to be put into relationship, but have small differences in duration, in choosing synchronization modes when shots have been put into relationship, but have significant differences in duration, in resolving individual cases of shots not put into relationship, for example in the case of a shot missing in one version or problems of a purely artistic nature.

The module 4 supplies as output a signal constituted by a computer file forming the final product, this file being representative of the editing determined automatically or semiautomatically, according to the choice of the user, by the processing program. This file, compatible with the format of the editing machine, not represented in the drawing, contains the sequential list of the time codes of the shots of the versions to be synchronized.

The human operator then edits this list and can validate or modify their editing commands. Such a list comprises the shots, whose difference in duration is large, the shots which have not been able to be put into relationship and the shots whose automatic synchronization solution requires validation.

An advantageous variant of a procedure for synchronizing various monolingual linguistic versions will be described in conjunction with FIGS. 8a, 8$b_1$ to 8$b_3$, and 8$c_1$, to 8$c_2$, collectively referred to as Figures.

Figures 1, 8B:
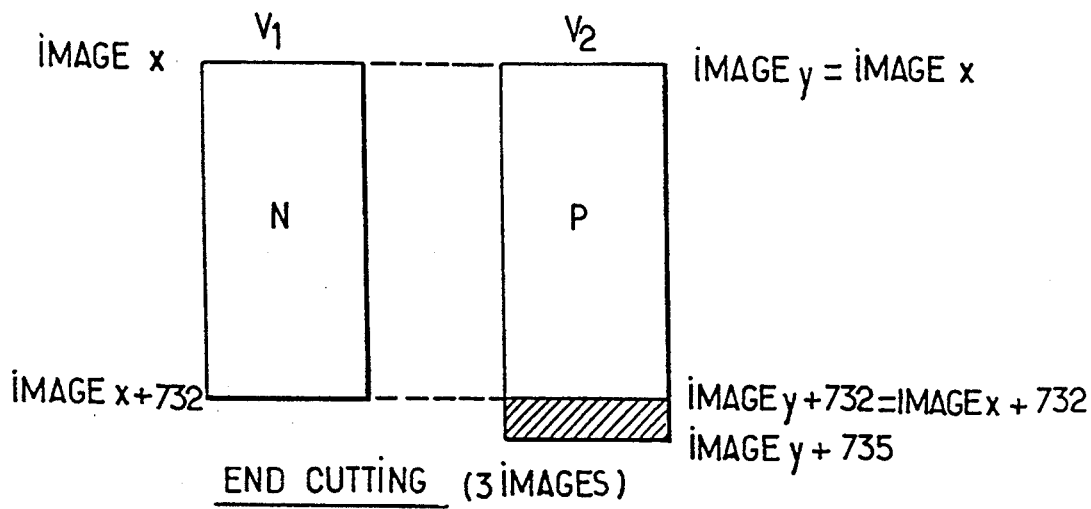
Figures 2, 8B:
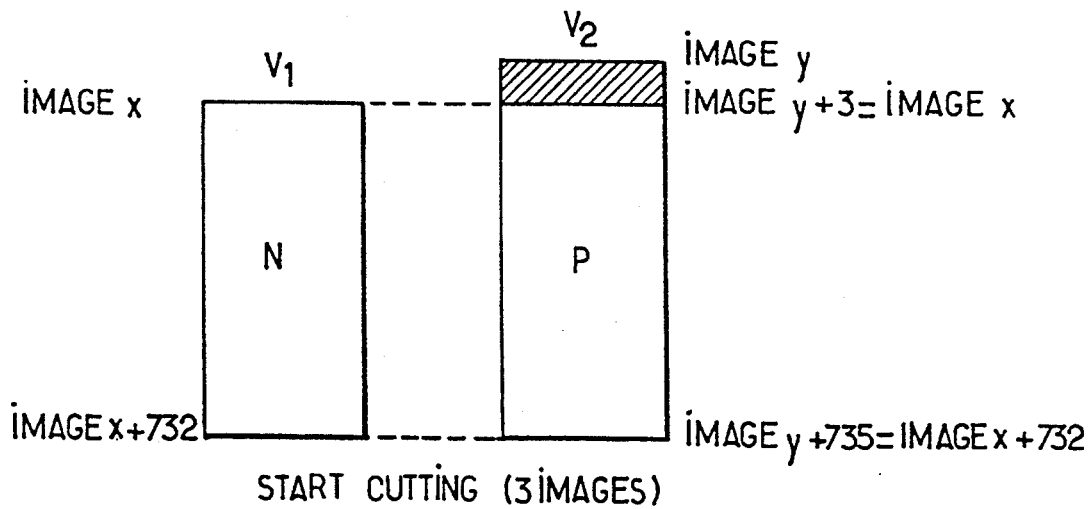
Figures 3, 8B:
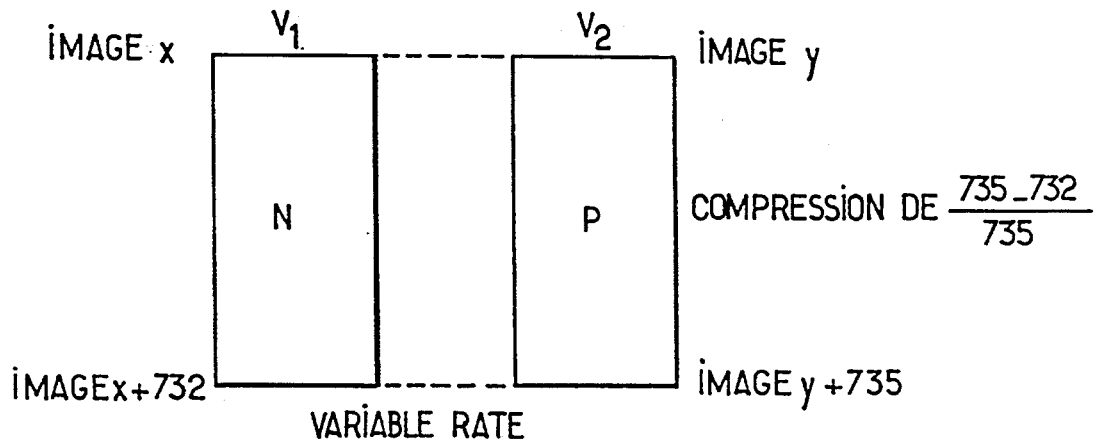
Figures 1, 8C:
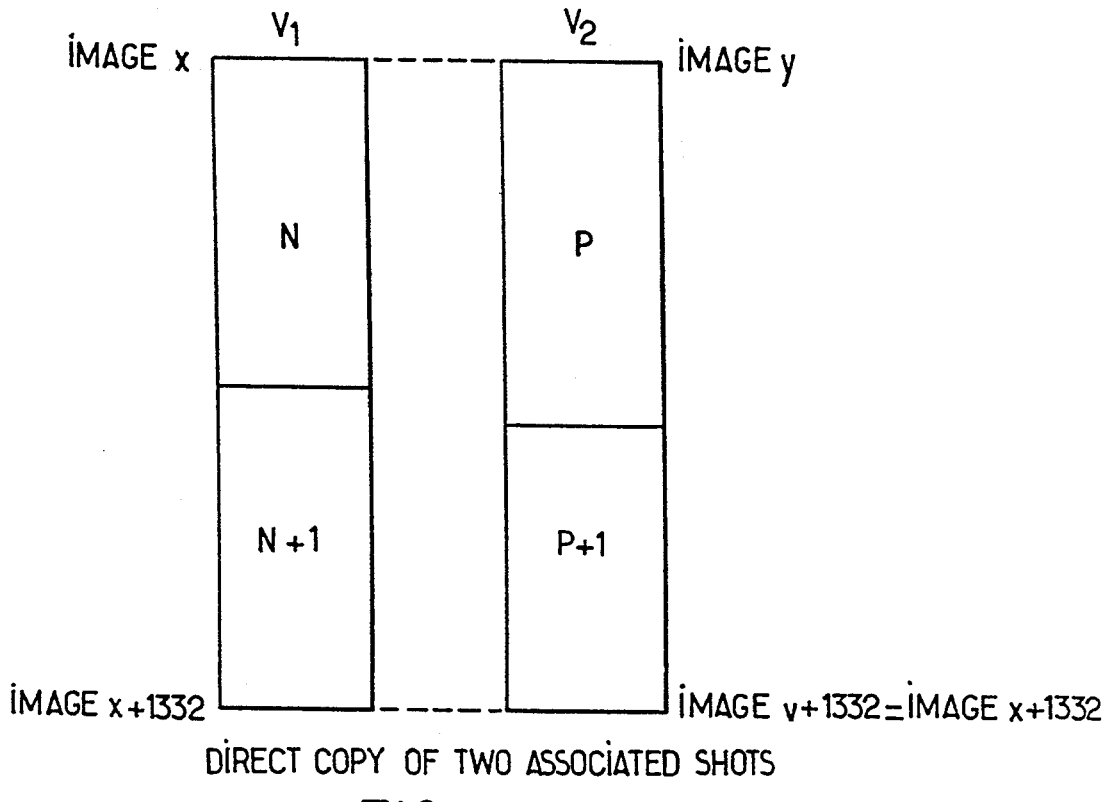
Figures 2, 8C:
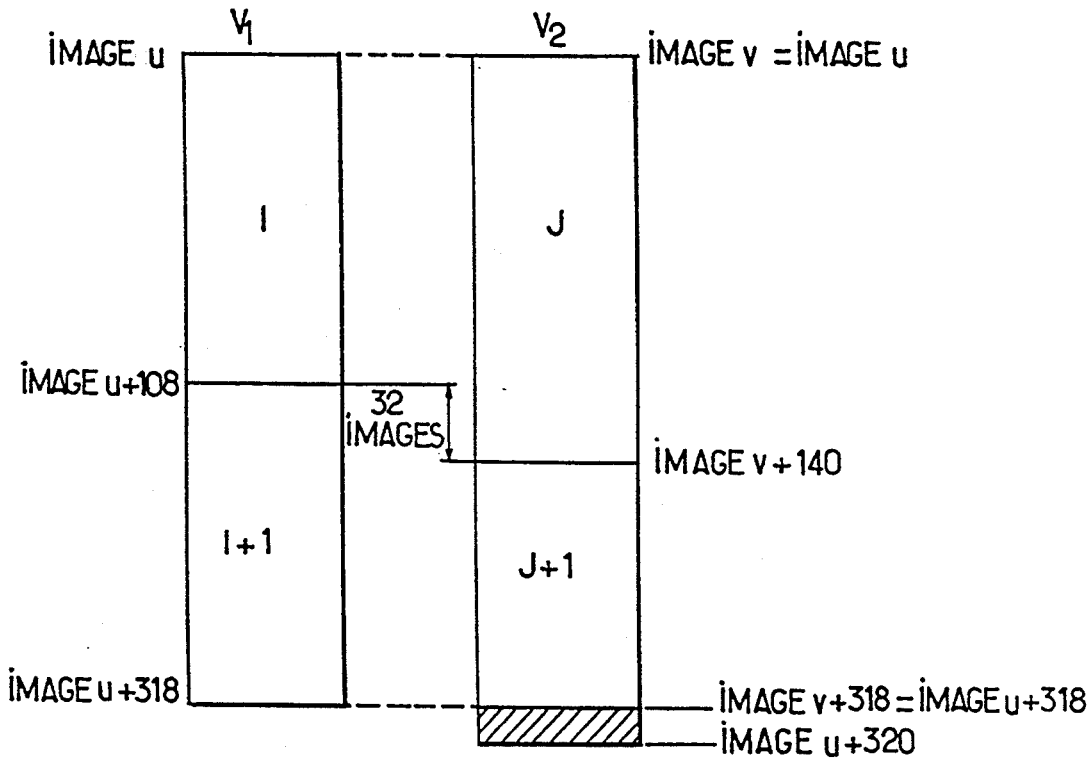

Such a variant enables artistic and technical characteristics of the work itself to be taken into account. In FIGS. 8a to 8c, two separate monolingual versions to be synchronized are indicated by way of non-limiting example by V1 and V2, the version V1 serving as the reference for example and the version V2 constituting in fact the version to be compared and synchronized.

The great diversity of the situations and the impossibility of a priori evaluation of the subjective consequences of the synchronization actions limit the automation capacity of these. Experiments have shown

TABLE 9

| VERS.1 SHOT No | DUR DIFF. VERS2−VERS1 | DUR DIFF. VERS3−VERS1 | DUR DIFF. VERS4−VERS1 | DUR DIFF. VERS5−VERS1 |
|---|---|---|---|---|
| 1 | 0 | 0 |  | 0 |
| 2 | 0 | 0 | 0 | −1 |
| 3 | 0 | 0 | 0 | 0 |
| 4 | 0 | 0 | 0 | 0 |
| 5 | 0 |  | 0 | 5 |
| 6 | 0 | 0 | −1 | 3 |
| 7 | 0 | 0 | 0 | 0 |
| 8 | 0 | 0 | 0 | 0 |
| 9 | 0 | 0 | 0 | 0 |
| 10 | 0 | 0 | 234 | 0 |

Very small differences in duration between shots, less than 10 images for example, may then be compensated for by time-compression or -expansion processing operation of the audio signal, AuVl, and the larger differhowever that, most often, the differences in duration result from start- or end-of-shot cutting operations, that they are exactly compensated for and therefore cancel each other out, or alternatively that they are considerably reduced by grouping together several consecutive shots. The automatic actions for each possible choice of corresponding synchronization can then be introduced into the list of the various applicable solutions, it being possible for indicators or commentaries intended to inform the operator to be introduced. Thus the operator may have available an assistance for testing various solutions. He can choose one or none of them, and may then decide, if none is satisfactory, to perform the work in manual mode.

In a non-limiting manner, the aforementioned solutions may consist in performing either a start-of-shot coincidence operation with preservation of the shortest shot and end-of-shot cutting of the longest shot, or an end-of-shot coincidence operation with preservation of the shortest shot and start-of-range cutting of the longest shot, or a preservation of all the shots, the start- and end-of-shot coincidence operation being able to be obtained by processing one of the versions, processing such as, for example, reading at a variable different rate for deviations, the duration of which does not exceed 4% of the duration of the shot, or an association of consecutive shots, the overall duration of which has a difference which is zero or is at most equal to the duration of a few images, for example ten images, as a result of the inter-shot compensations for the deviations.

The various solutions are represented from the two aforementioned monolingual versions V1 and V2, the most probable coincidences of which have been established and made clear, in accordance with the subject of the invention, as represented in FIG. 8a. FIGS. 8$b_1$ to 8$b_3$ represent diagrammatically the implementation of the first three previously mentioned solutions, namely end cutting, start cutting and reading at variable rate, respectively. The image numbers are arbitrary and given purely by way of illustration, the degree of compression 3/735 being able to correspond to a real case. Finally, FIGS. 8$c_1$ and 8$c_2$ represent diagrammatically two types of editing by association of shots with a direct copy of two associated shots, and a copy of two associated shots and end-of-shot cutting of two images, respectively.

A video analysis system has thus been described for editing a recorded or broadcast, televised program, in the form of a succession of images, which is particularly powerful insofar as this system and its use permit a complete automation of the determination of the shot changes arising in a program for the compiling and synchronization of various data accompanying programs, such as 16/9-4/3 reframing, introduction of subtitles or various procedures for post-production of films or of video recordings, such as colorization of black and white films, for example. The system, which is the subject of the present invention, and its use also enable post-production operations to be carried out, such as procedures for post-synchronization of films for compiling multilingual television programs from dubbed archives considered as corresponding monolingual versions.

Furthermore, the system, which is the subject of the present invention, and its use also enable assistance to the operations for checking duration of transmission broadcasting on recordings in parallel with the antenna transmission, such as checking the conformity of the specification of programming companies, conformity of the broadcasting times for advertising slots or of political broadcasts during electoral campaigns, for example.

We claim:
1. A video analysis system for editing a recorded or broadcast, televised program in the form of a succession of images, each image being recorded or broadcast in the form of audio- and video-frequency data associated with the image of order k in question and of an associated time code representative of said image, wherein said system comprises:
   means for measuring the time variance of the composition of the images, by determination, between two successive images of order k−1, k, of an image difference signal and of corresponding parameters representative of the scenic activity of the recorded or broadcast program for a group of at least two successive images, of order k−1, k;
   means for analyzing the recorded or broadcast program making it possible, from said difference signal and from said corresponding parameters representative of said scenic activity, to establish data representative of the cutting-up into shots, which consist of a group of p successive images, of said recorded or broadcast, televised program.

2. The system as claimed in claim 1, wherein said means for measuring the time variance of the composition of the images include:
   means for storing the video component S(i,j,k) of the image signal where i indicates the index of the component sample in the active line of the image in question, j indicates the index of the active line in the image in question and k indicates the order number of the analyzed image in question, and means for storing the component S(i,j,k−1) of the image signal of the image of prior order k−1 in question;
   means for calculating the image difference signal satisfying the relationship:

$$Sd(i,j,k) = A \cdot [S(i,j,k) - S(i,j,k-1)] + Sm$$

where
   A represents a value-weighing coefficient or a predetermined function,
   Sm represents a correction coefficient which is a function of the permissible dynamic range for the component S(i,j,k) in question.

3. The system as claimed in claim 1, wherein said means for measuring the time variance of the composition of the images furthermore include:
   means for calculating, for an image of order k, from said image difference signal Sd(i,j,k), a histogram HSd(k) of the number of occurrences of each amplitude level of the image difference signal Sd(i,j,k),
   means for calculating corresponding scenic-activity parameters by comparison of the distribution of the spectrum of each histogram HSd(k) with a plurality of reference models or distributions representative of corresponding scenic activities.

4. The system as claimed in claim 3, wherein said means for calculating, for an image of order k from the difference signal Ŝd(i,j,k) or from the filtered difference signal, a histogram HSd(k) include:
   an input interface circuit receiving the filtered difference signal Sd(i,j,k), said interface circuit supplying time reference signals (srt), video data signals (sdv) and clock signals (clk);
   a circuit generating service signals receiving, on the one hand, said time reference signals (srt) and, on the other hand, said clock signals (clk), and supplying service signals (ss), a circuit for sorting the video data signals (sdv) according to a histogram distribution law using predetermined video quantizing levels, said sorting circuit receiving, on the one hand, said video data signals (sdv) and, on the other hand, sequencing signals (slb) and supplying video data signals sorted by level (sdvtn), a plurality of storage registers, each register forming a bank of sorted-level values, intended to receive and to store said video data signals sorted by level (sdvtn) as a function of their level, an adder circuit for down-counting in each bank the number of occurrences of the amplitude levels of the sorted video signals, which circuit is connected via a read- (L) and write- (E) BUS data-link to each of said registers forming a bank, said adder circuit delivering, after reading and down-counting each bank, a bank down-count signal (sdb) representative, for each corresponding bank, of the number of occurrences of the amplitude levels of the sorted video data signals (sdv) relating to the signal Sd(i,j,k) in question.

5. The system as claimed in claim 3, wherein said means for calculating corresponding scenic-activity parameters include:

a microprogramed sequencing unit receiving the time reference signal (srt) and supplying a bank read signal (slb), a buffer register interconnected via the read-BUS (L) to each of said registers forming a bank, said buffer register comprising, on the one hand, an auxiliary memory circuit enabling the bank down-count signal (sdb(0,1,2,3)) relating to each bank to be stored and, on the other hand, a conversion table, said conversion table supplying, from the bank down-count signal, a scenic-activity indicator signal (ias) for the pair of successive images of order k−1, k in question.

6. The system as claimed in either of claims 4, wherein, values, which are symmetrical with respect to the level of amplitude value corresponding to that of the average luminance, are assigned to said sorted-level value banks, a first bank being assigned a continuous range of values which are symmetrical with respect to said amplitude level of the average luminance, and two ranges of discrete values of values, which are symmetrical with respect to said amplitude level of the average luminance, being assigned to each of the other banks, the spectrum of the histogram HSd(k) being expressed by the bank down-count signals (sdb(0,1,2,3)) relating to the bank in question.

7. The system as claimed in claim 4, wherein said bank down-count signals sdb(0,1,2,3) are quantized onto a number NAS of scenic-activity levels, so as to define, for each bank, a quantized elementary scenic-activity level, nase(0,1,2,3), the set of the quantized elementary scenic-activity level signals forming said scenic-activity indicator, (ias).

8. The system as claimed in claim 6, wherein, there being associated with said first bank:

a second bank to which two ranges of discrete values of symmetrical values are assigned, these two ranges being themselves adjacent to the central-value range associated with the first bank, a third bank to which two ranges of discrete values of symmetrical values are assigned, these two ranges being themselves adjacent respectively to the two ranges of discrete values associated with the second bank, and a fourth bank to which two ranges of discrete values or symmetrical values are assigned, these two ranges being themselves adjacent respectively to the two ranges of discrete values associated with the third bank, said scenic-activity indicator (ias) is representative of the absence of scenic activity, of a low scenic activity, of a medium scenic activity and of a high scenic activity, the absence of scenic activity being defined by an elementary scenic-activity level, relating to the first bank, greater than the average value NAS/2 of the scenic-activity levels, nase(0)≧NAS/2, the elementary scenic-activity level relating to the second, third and fourth banks being substantially zero, nase(1,2,3)=0, the low scenic activity being defined by an elementary scenic-activity level relating to the first bank greater than the average value NAS/2 of the scenic-activity levels, nase(0)≧NAS/2, the elementary scenic-activity level relating to the second bank being less than 1, nase(1)≦1 and the elementary scenic-activity level relating to the third and to the fourth banks being substantially zero, nase(2)=nase(3)=0, the medium scenic activity being defined by an elementary scenic-activity level relating to the first bank greater than the average value NAS/2 of the scenic-activity levels, nase(0)≧NAS/2, the elementary scenic-activity level relating to the second and third bank being less than or equal to one, nase(1)≦1, and nase(2) ≦1, and the elementary scenic-activity level relating to the fourth bank being substantially zero, nase(3)=0, . the high scenic activity being defined by an elementary scenic-activity level relating to the first bank less than or equal to the average value NAS/2 of the scenic-activity levels nase(0)≦NAS/2, or by an elementary scenic-activity level relating to the fourth bank, greater than or equal to the average value NAS/2 of the scenic-activity levels, nase(3)≧NAS/2.

9. The system as claimed claim 8, wherein said means for analyzing the broadcast program, from said difference signal and from the parameters representative of the scenic activity, include:

calculator means interconnected with said means for measuring the time variance of the composition of the images, said calculator means enabling said scenic-activity parameters to be stored, said calculator means comprising:

discrimination software making it possible to select the images of order k in question, or the groups of p images, the scenic-activity parameters of which are greater than one or more predetermined threshold values, which makes it possible to establish time and/or cardinal data representative of the cutting-up into shots, consisting of p successive constituent images of said recorded or broadcast, televised program.

10. The system as claimed in claim 9, wherein said calculator means receive as input:

a time code signal (ct) representative of the succession of each image of order k, which images constitute the broadcast program, a scenic-activity indicator signal (ias) representative of the scenic-activity parameters for two successive images of order k−1, k, said signal being supplied by said means for measuring the time variance of the composition of the images, an exchange-synchronization signal (se) enabling data corresponding to said time code signal and to said scenic-activity signal to be acquired at the image frequency by said calculator means, said discrimination software making it possible, using as discrimination criterion the scenic-activity indicator of every image of order k or group of p images of order k-(p−1),k, to determine the editing points of said program, corresponding to the two successive shots, P−1, P, said discrimination criterion being established with respect to three noteworthy standard shots of scenic activity, a first standard shot, indicated by a cut shot, such as the passage from one person to another person in a dialogue situation, having a scenic activity with an abrupt time variation, a second standard shot, indicated by a lap-dissolve shot, having a scenic activity with a substantially linear time transition, and a third standard shot, designated by an overlay shot, having a pulse-type time variation of scenic activity, said calculator means supplying a signal representative, for the corresponding broadcast program, of its cutting-up into shots, signal (srdp), each shot of row P being defined by a start time-code and an end time-code.

11. A method for editing a recorded, or broadcast, televised program in the form of a succession of images, each image being recorded or broadcast in the form of audio- and video-frequency data associated with the image of order k in question and of an associated time code representative of said image, said method comprising measuring the time variance of the composition of the images, by determination, between two successive images of order k−1, k, of an image difference signal and of corresponding parameters representative of the scenic activity of the recorded or broadcast program for a group of at least two successive images, of given order k−1, k; and analyzing the recorded or broadcast program so to enable, based on said difference signal and said corresponding parameters representative of the scenic activity, establishing of data representative of the cutting-up into shots, which consist of a group of p successive images, of said recorded or broadcast televised program, to thereby allow replacement of the steps of searching, by means of viewing, for the editing points of the programs or parts of the programs during video or cinema film post-production operations or checking the conformity of the editing or broadcasting of the final product, or the composition of multilingual-narrative televised programs.

12. The method as claimed in claim 11, wherein, with a view to producing a composition of multilingual-narrative programs by post-composition of monolingual-narrative programs, attributes of common video images of the same program, said method comprising:

performing an analysis step of each monolingual program in order to establish the data representative of the cutting-up into shots consisting of a group of pl successive images, where pl indicates, for the monolingual version Vl in question, the number of constituent images of a shot Pl in question;

establishing a systematic correlation between the various shots Pl of each monolingual version which consist of a predetermined number pl of successive images for each monolingual version Vl in question, so as to establish a time coherence between all the shots Pl of each monolingual version and each monolingual narrative, said correlation enabling the time and/or cardinal data to be adopted in terms of minimum and maximum number of successive images pl constituting a given shot Pl enabling all the monolingual narratives in question to be carried;

storing, in vector form (Pml, Plt, plt), said data so as to constitute an editing or composition frame of the multilingual program in which, in the order of the shots Pml which can go back into the composition of the final multilingual program, are associated, for each monolingual version in question, the order of the shot Plt, the number of successive images plt and the time data for the start and end of the shot Plt in question.

13. The use as claimed in claim 12, wherein said step for analyzing each monolingual program comprises, from the signal representative of the cutting-up into shots (ŝrdp) obtained for each monolingual version Vl:

a step for complementarily filtering of said signal representative of the cutting-up into shots (srdp) in order to generate a corresponding filtered signal representative of the cutting-up into shots (srdp), a step for calculating the duration of the shots, (DUR), and of the transition shots (TRANS) by subtraction of the successive time codes (ct), a step for calculating and assigning, to the first shot of each monolingual version Vl, a virtual time code (TCIV) or arbitrary value and, by recurrence, for each subsequent successive shot Pl, a virtual time code satisfying the relationship:

$$TCIV(Pl) = TCIV(Pl-1) + DUR(Pl-1) + TRANS(Pl-1),$$

a step for creating a processed signal representative of the cutting-up into shots for the monolingual version in question (srdpt), said signal allowing the identification of each shot Pl and containing, beyond to the real time code, a virtual time code, a shot number, a duration, a duration of the associated transition shot.

14. The method as claimed in claim 12, wherein, for a number L of monolingual versions, said correlation is performed by a group of two monolingual versions, the correlation between successive shots Pl, Pl+1 of two monolingual versions Vl, Vl+1 being performed by comparative analysis of the duration and/or of the corresponding number of images pl, pl+1 for the shots in question, or of a linear combination of said durations or of said numbers of successive images, over a predetermined number of successive shots Pl, P+1,l, ... P+r,l; Pl+1, P+1,l+1, ... P+r,l+1 of both monolingual versions in question.

15. The method as claimed in one of claims 12, wherein said step for establishing a systematic correlation between the shots Pl of each monolingual version consists, from said signal representative of the cutting-up into a processed shot, (srdpt), in performing a putting-into-relationship operation, shot to shot, between two monolingual versions Vl, Vl+1, by comparison of the duration (DUR) of their corresponding shots Pl; P+r,l+1, said comparison being performed by concatenation of elementary comparison steps based on a constraint criterion of a more or less strict equality of the shot durations (DUR) and/or of the transition durations (TRANS), said comparison being performed, for each elementary comparison, on a search window constituting, for a shot Pl of order P of the version Vl, a reduced environment of shots Pl+1 to P+sl+1, of the version Vl+1, the putting into relationship of two shots, respectively Pl and P+sl+1, of the two versions Vl, Vl+1 being immediately followed by a relative reframing of the shorter virtual time code TCIV of the two versions Vl, Vl+1 in question, the virtual time code of the next shots of the version, the virtual time code of which has been re-updated, also being re-updated, until the recognition of an already re-updated virtual time code.

16. The method as claimed in claim 12, wherein, with a view to producing said composition of multilingual-narrative televised programs by post-composition of L monolingual-narrative programs, attributes of common video images of the same program, said post-composition operation consists, from the various versions Vl constituted by a video signal ViVl and a corresponding audio signal AuVl of said composition frame, and from one of the versions taken as the reference version, Vl, in performing a video post-synchronization between the video signals of said reference version and of each other version, two shots, or groups of shots, Pl, Pl, with l≠l, of the reference version and of the version subjected to synchronization being synchronous when the difference in duration of the two shots, or groups of shots, put into relationship is zero, the post-synchronized shot being obtained by selection and storage of one of the corresponding video signals of the corresponding audio signals AuV1, AuVl, which are respectively synchronized to their corresponding version, so as to constitute L-1 pairs of post-synchronized versions, in performing a comparison, two by two, of the difference in duration of the pairs of post-synchronized shots in order to determine, by intersection, the shots which require no intervention, in compensating for the very small duration differences, less than a predetermined number of images, by time-compression or -expansion processing of the audio signal AuVl, the larger differences in duration being able to be compensated for either by suppression of the longest-duration audio signal or by external intervention.

17. The method as claimed in claim 15, wherein the putting into relationship, shot to shot, of each monolingual version consists in performing either a start-of-shot coincidence operation, with preservation of the shortest shot and end-of-shot cutting of the longest shot, or an end-of-shot coincidence operation with preservation of the shortest shot and start-of-range cutting of the longest shot, or a preservation of all the shots, the start- and end-of-shot coincidence operation being obtained by processing one of the monolingual versions, or an association of consecutive shots, the overall duration of which has a difference which is zero or at most equal to the duration of a few images.

* * * * *